United States Patent
Yoshimoto et al.

(10) Patent No.: US 10,735,136 B2
(45) Date of Patent: Aug. 4, 2020

(54) BASE STATION APPARATUS, TERMINAL APPARATUS, AND COMMUNICATION METHOD FOR PERFORMING A RETRANSMISSION CONTROL OF UPLINK DATA IN GRANT FREE MULTIPLE ACCESS

(71) Applicant: SHARP KABUSHIKI KAISHA, Sakai, Osaka (JP)

(72) Inventors: Takashi Yoshimoto, Sakai (JP); Jungo Goto, Sakai (JP); Osamu Nakamura, Sakai (JP); Yasuhiro Hamaguchi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 46 days.

(21) Appl. No.: 16/313,097

(22) PCT Filed: Jun. 22, 2017

(86) PCT No.: PCT/JP2017/022965
§ 371 (c)(1),
(2) Date: Dec. 24, 2018

(87) PCT Pub. No.: WO2018/008406
PCT Pub. Date: Jan. 11, 2018

(65) Prior Publication Data
US 2019/0229843 A1 Jul. 25, 2019

(30) Foreign Application Priority Data
Jul. 5, 2016 (JP) ................................ 2016-133243

(51) Int. Cl.
*H04L 1/00* (2006.01)
*H04W 28/00* (2009.01)
(Continued)

(52) U.S. Cl.
CPC .......... *H04L 1/0045* (2013.01); *H04L 1/0041* (2013.01); *H04L 5/0055* (2013.01);
(Continued)

(58) Field of Classification Search
None
See application file for complete search history.

(56) References Cited

U.S. PATENT DOCUMENTS

| 8,656,248 | B2* | 2/2014 | Palanki | ................. H04L 1/0057 714/701 |
| 10,382,169 | B2* | 8/2019 | Cao | ........................ H04L 1/1845 |

(Continued)

FOREIGN PATENT DOCUMENTS

| JP | 2013-229928 A | 11/2013 |
| JP | 2014-197887 A | 10/2014 |
| WO | 2015/022736 A1 | 2/2015 |

OTHER PUBLICATIONS

"3rd Generation Partnership Project; Technical Specification Group Radio Access Network; Study on Scenarios and Requirements for Next Generation Access Technologies; (Release 14)", 3GPP TR38. 913 V0.3.0 (Mar. 2016).

(Continued)

*Primary Examiner* — Justin R Knapp
(74) *Attorney, Agent, or Firm* — ScienBiziP, P.C.

(57) ABSTRACT

Provided are a base station apparatus, a terminal apparatus and a communication method, capable of an efficient retransmission control of uplink data of which a resource for transmission is not discerned in grant-free multiple access. A terminal apparatus configured to communicate with a base station apparatus includes a transmitter configured to transmit an identifying signal indicating that the terminal apparatus itself transmits an uplink data channel and the uplink data channel includes an uplink data bit, a bit representing an identifier of the terminal (Continued)

apparatus, a first error detection bit generated from the uplink data bit, and a second error detection bit generated from the identifier of the terminal apparatus. The first error detection bit is scrambled using the identifier of the terminal apparatus, and the second error detection bit is scrambled using the identifying signal.

14 Claims, 12 Drawing Sheets

(51) Int. Cl.
| | |
|---|---|
| *H04L 5/00* | (2006.01) |
| *H04L 1/08* | (2006.01) |
| *H04L 1/18* | (2006.01) |
| *H04W 28/04* | (2009.01) |
| *H04W 72/04* | (2009.01) |
| *H04W 88/08* | (2009.01) |

(52) U.S. Cl.
CPC ....... *H04W 28/04* (2013.01); *H04W 72/0466* (2013.01); *H04W 88/08* (2013.01)

(56) References Cited

U.S. PATENT DOCUMENTS

| | | | |
|---|---|---|---|
| 10,477,573 B2* | 11/2019 | Vajapeyam | ....... H04W 72/1268 |
| 2009/0086698 A1 | 4/2009 | Roy et al. | |
| 2011/0194639 A1 | 8/2011 | Nakao et al. | |
| 2014/0254544 A1* | 9/2014 | Kar Kin Au | .......... H04L 1/0038 |
| | | | 370/330 |
| 2016/0219627 A1* | 7/2016 | Au | .................... H04W 74/0841 |
| 2017/0367110 A1* | 12/2017 | Li | ........................... H04W 4/70 |

OTHER PUBLICATIONS

"WF on Scenarios for Multiple Access", ZTE, ZTE Microelectronics, InterDigital, Qualcomm Inc., Spreadtrum, R1-165595, 3GPP TSG RAN WG1#85 meeting, Nanjing, China, May 23-27, 2016.
NTT Docomo, Inc., "Uplink multiple access schemes for NR", 3GPP TSG RAN WG1 Meeting #85, R1-165174, Nanjing, China May 23-27, 2016.

* cited by examiner

BASE STATION APPARATUS, TERMINAL APPARATUS, AND COMMUNICATION METHOD FOR PERFORMING A RETRANSMISSION CONTROL OF UPLINK DATA IN GRANT FREE MULTIPLE ACCESS

TECHNICAL FIELD

The present invention relates to a base station apparatus, a terminal apparatus, and a communication method.

BACKGROUND ART

In a communication system such as Long Term Evolution (LTE) and LTE-Advanced (LTE-A), specified in the Third Generation Partnership Project (3GPP), a terminal apparatus (UE: User Equipment) uses a Scheduling Request (SR) or a Buffer Status Report (BSR) to request a radio resource for transmitting uplink data from a base station apparatus (eNodeB: evolved Node B). The base station apparatus gives uplink transmission permission (UL Grant) to each terminal apparatus on the basis of a SR and a BSR. Upon receiving the control information on the UL Grant from the base station apparatus, the terminal apparatus transmits the uplink data with a prescribed radio resource on the basis of the uplink transmission parameter included in the UL Grant.

In a case that the uplink data has been correctly received, the base station apparatus transmits an Acknowledgement (ACK) in the downlink to the terminal apparatus after a prescribed time from the reception of the uplink data. On the other hand, in a case where the uplink data could not be correctly received, the base station apparatus transmits a Negative Acknowledgement (NACK) to the terminal apparatus after a prescribed time from the reception of the uplink data. Upon receiving the NACK, the terminal apparatus retransmits the data related to the uplink data. In this manner, the base station apparatus controls all the uplink data transmissions (data transmission from the terminal apparatus to the base station apparatus). Orthogonal Multiple Access (OMA) is realized by the base station apparatus controlling uplink radio resources.

In the 3GPP, radio access technology for realizing Massive Machine Type Communication (mMTC) is being specified as the fifth generation mobile communication system (5G) (NPL 1). In mMTC, it is assumed that many devices such as terminal apparatuses and sensors transmit and receive small data. Grant-free Non-Orthogonal Multiple Access (NOMA) is being studied for the purpose of uplink mMTC (NPL 2). The grant-free Non-Orthogonal Multiple Access allows data transmitted from terminal apparatuses exceeding the number of receive antennas of the base station apparatus to be non-orthogonally multiplexed in space. In the grant-free Non-Orthogonal Multiple Access, the terminal apparatus transmits the uplink data to the base station apparatus without performing SR transmission, UL Grant reception, or the like. Therefore, even in a case that many devices transmit and receive small size data, grant-free Nonorthogonal Multiple Access is capable of suppressing an increase in overhead due to control information. Furthermore, in grant-free Non-Orthogonal Multiple Access, since UL Grant reception or the like is not performed, a period of time when transmission data is generated to when the data is transmitted may be shortened.

CITATION LIST

Non Patent Literature

NPL 1: "3rd Generation Partnership Project; Technical Specification Group Radio Access Network; Study on Scenarios and Requirements for Next Generation Access Technologies; (Release 14)" 3GPP TR 38.913 V0.3.0 (2016-03)

NPL 2: R1-165595, 3GPP TSG RAN WG 1 #85 Meeting, Nanjing, China, May 23-27, 2016

SUMMARY OF INVENTION

Technical Problem

However, in the grant-free Non-Orthogonal Multiple Access, since the terminal apparatus transmits the uplink data without receiving UL Grant, the base station apparatus needs to perform a retransmission control such as transmission of ACK or NACK for the uplink data for which uplink resource assignment and the like is not controlled (namely, the uplink data of which an uplink resource for transmission is not discerned), unlike the Orthogonal Multiple Access in which the uplink radio resource is controlled.

The present invention has been made in view of the above circumstances, and an object thereof is to provide a base station apparatus, terminal apparatuses, and a communication method that enable an efficient retransmission control of the uplink data of which an uplink resource for transmission is not discerned, in grant-free multiple access in which a base station apparatus handles a large number of terminal apparatuses.

Solution to Problem

To solve the above-mentioned problems, a base station apparatus, a terminal apparatus, and a communication method according to the present invention are configured as follows.

(1) An aspect of the present invention is a terminal apparatus configured to communicate with a base station apparatus, the terminal apparatus including, a transmitter configured to transmit an identifying signal indicating that the terminal apparatus itself transmits an uplink data channel and the uplink data channel, and a receiver configured to receive a signal indicating delivery acknowledgement for the uplink data channel. The uplink data channel includes an uplink data bit, a bit representing an identifier of the terminal apparatus itself, a first error detection bit generated from the uplink data bit, and a second error detection bit generated from the identifier of the terminal apparatus itself, and the first error detection bit is scrambled using the identifier of the terminal apparatus and the second error detection bit is scrambled using the identifying signal.

(2) In addition, according to an aspect of the present invention, the receiver is configured to descramble the signal indicating the delivery acknowledgement using a sequence associated with the identifier of the terminal apparatus.

(3) In addition, according to an aspect of the present invention, the receiver is configured to descramble the signal indicating the delivery acknowledgement using a sequence associated with the identifying signal.

(4) In addition, according to an aspect of the present invention, the receiver is configured to descramble the signal indicating the delivery acknowledgement using a sequence associated with a subframe number of a subframe at which the uplink data channel is transmitted.

(5) In addition, according to an aspect of the present invention, the receiver is configured to descramble the signal indicating the delivery acknowledgement using a sequence associated with a subframe number of a subframe at which the identifying signal is transmitted.

(6) In addition, according to an aspect of the present invention, the base station apparatus is configured to interpret that the base station apparatus fails to identify a terminal in a case that the receiver could not receive the signal indicating the delivery acknowledgement for the uplink data channel using an identifier applied on the first error detection bit.

(7) In addition, according to an aspect of the present invention, the terminal apparatus is configured to assume that the terminal apparatus itself is not identified by the base station apparatus in a case that the receiver does not receive the signal indicating the delivery acknowledgement for the uplink data channel by a receive timing of a signal indicating transmission acknowledgement.

(8) In addition, an aspect of the present invention is a base station apparatus configured to communicate with a terminal apparatus, the base station apparatus including, a receiver configured to receive an identifying signal for identifying a terminal apparatus that transmits an uplink data channel and the uplink data channel, and a higher layer processing unit configured to perform error detection using a first error detection bit and a second error detection bit included in the uplink data channel. The receiver is configured to perform descrambling processing for the first error detection bit using the identifying signal and to perform descrambling processing for the second error detection bit using an identifier of the terminal apparatus used for generating the first error detection bit.

(9) In addition, according to an aspect of the present invention, the base station apparatus further includes a transmitter configured to transmit a signal indicating delivery acknowledgement for the uplink data channel. The transmitter is configured to scramble the signal indicating the delivery acknowledgement using a sequence associated with the identifier of the terminal apparatus.

(10) In addition, according to an aspect of the present invention, in a case that an error is detected with a first error detection bit, the transmitter is configured to scramble the signal indicating the delivery acknowledgement using the sequence associated with the identifier of the terminal apparatus.

(11) In addition, according to an aspect of the present invention, the base station apparatus further includes a transmitter configured to transmit a signal indicating delivery acknowledgement for the uplink data channel. The transmitter is configured to scramble the signal indicating the delivery acknowledgement using a sequence associated with the identifying signal.

(12) In addition, according to an aspect of the present invention, in a case that an error is detected with a second error detection bit, the transmitter is configured to scramble the signal indicating the delivery acknowledgement using the sequence associated with the identifying signal.

(13) In addition, an aspect of the present invention is a method of communication used in a terminal apparatus for communicating with a base station apparatus, the method comprising the steps of, transmitting an identifying signal indicating that the terminal apparatus itself transmits an uplink data channel and the uplink data channel, and receiving a signal indicating delivery acknowledgement for the uplink data channel. The uplink data channel includes an uplink data bit, a bit representing an identifier of the terminal apparatus, a first error detection bit generated from the uplink data bit, and a second error detection bit generated from the identifier of the terminal apparatus, and the first error detection bit is scrambled using the identifier of the terminal apparatus, and the second error detection bit is scrambled using the identifying signal.

(14) In addition, an aspect of the present invention is a method of communication used in a base station apparatus for communicating with a terminal apparatus, the method comprising the steps of, receiving an identifying signal for identifying a terminal apparatus that transmits an uplink data channel and the uplink data channel, and performing error detection using a first error detection bit and a second error detection bit included in the uplink data channel. In the step of performing the error detection, descrambling processing is performed for the first error detection bit using the identifying signal, and descrambling processing is performed for the second error detection bit using an identifier of the terminal apparatus used for generating the first error detection bit.

Advantageous Effects of Invention

According to one or more aspects of the present invention, in the grant-free multiple access in which a base station apparatus handles a large number of terminal apparatuses, the base station apparatus is capable of efficiently performing a retransmission control of the uplink data of which an uplink resource for transmission is not discerned.

DESCRIPTION OF EMBODIMENTS

The communication system according to the present embodiment includes a base station apparatus (a cell, a small cell, a serving cell, a component carrier, an eNodeB, a Home eNodeB) and a terminal apparatus (a terminal, a mobile terminal, a User Equipment (UE)). In the communication system, in a case of downlink, the base station apparatus serves as a transmission device (a transmission point, a group of transmit antennas, a group of transmit antenna ports), and the terminal apparatus serves as a reception device (a reception point, reception terminal, a group of receive antennas, a group of receive antenna ports). In a case of uplink, the base station apparatus serves as a reception device, and the terminal apparatus serves as a transmission device. The communication system can also be applied to Device-to-Device (D2D) communication. In that case, both the transmission device and the reception device serve as terminal apparatuses.

The communication system is not limited to data communication between a terminal apparatus and a base station apparatus with human interventions, and may also be applied to types of data communication that does not require human interventions (hereinafter referred to as MTC), such as, Machine Type Communication (MTC), Machine-to-Machine Communication (M2M communication), communication for Internet of Things (IoT), and Narrow Band-IoT (NB-IoT). In this case, the terminal apparatus serves as the MTC terminal. Note that, in the following description, the description is made in a case that a Discrete Fourier Transform Spread-Orthogonal Frequency Division Multiplexing (DFTS-OFDM), which is also referred to as SC-FDMA, communication is used for the uplink, and a OFDM communication is used for the downlink; however, transmission schemes are not limited thereto, and other schemes may be used.

The base station apparatus and the terminal apparatus according to the present embodiment are capable of communicating with each other in a so-called licensed band for which a wireless carrier has obtained a use permission (license) from a country or region in which the carrier provides a service, and/or in a so-called unlicensed band, which is a frequency band for which no use permission (license) from a country or region is required.

According to the present embodiment, "X/Y" includes the meaning of "X or Y". According to the present embodiment, "X/Y" includes the meaning of "X and Y". According to the present embodiment, "X/Y" includes the meaning of "X and/or Y".

First Embodiment

Figure 1:
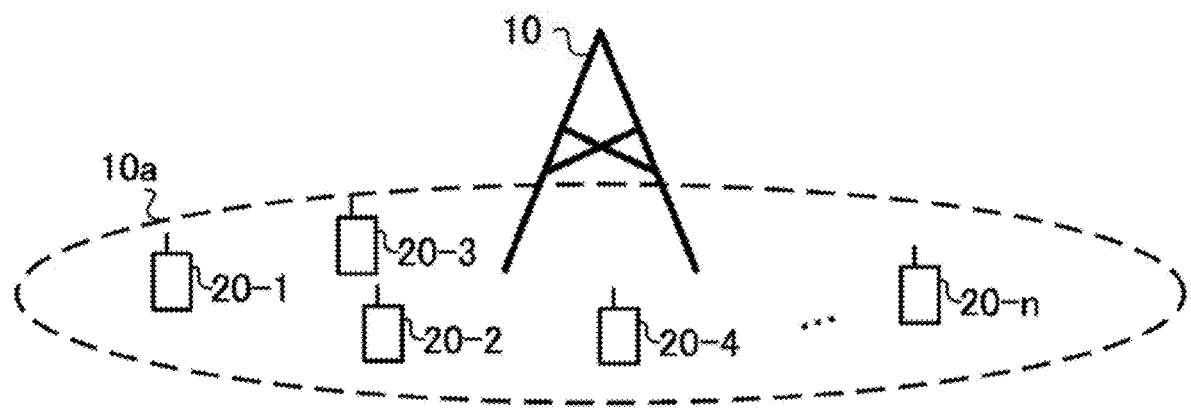
FIG. 1 is a diagram illustrating an example of a communication system according to a first embodiment.

FIG. 1 is a diagram illustrating an example of a communication system according to the present embodiment. The communication system according to the present embodiment includes a base station apparatus 10 and terminal apparatuses 20-1 to 20-$n$ (n is a natural number). The terminal apparatuses 20-1 to 20-$n$ are also collectively referred to as a terminal apparatus 20. Coverage 10$a$ is a range (a communication area) (also referred to as a cell) in which the base station apparatus 10 can connect to the terminal apparatus 20.

In FIG. 1, the base station apparatus 10 and the terminal apparatus 20 support the grant-free multiple access in the uplink (also referred to as grantless, or contention-based). In the grant-free multiple access, the terminal apparatus 20 transmits uplink data without receiving uplink transmission permission (also referred to as uplink Grant (UL Grant), or scheduling grant) from the base station apparatus 10 (without receiving UL Grant). The grant-free multiple access allows the uplink data transmitted by multiple terminal apparatuses to overlap (collide) each other in time/frequency/space resources. The grant-free multiple access allows the terminal apparatuses 20 to be connected in Non-Orthogonal Multiple Access in addition to the Orthogonal Multiple Access, in a case that the terminal apparatuses 20 transmit the uplink data at the same time and in the same frequency (for this reason also referred to as grant free, Uplink Non-Orthogonal Multiple Access (UL-NOMA)). For example, in Non-Orthogonal Multiple Access, uplink data signals transmitted from terminal apparatuses exceeding the number of receive antennas of the base station apparatus are non-orthogonally multiplexed in space. Note that the base station apparatus 10 and the terminal apparatus 20 may also support multiple access in which the terminal apparatus transmits the uplink data on the basis of the scheduling grant (uplink grant).

The base station apparatus 10 detects an uplink data signal transmitted by each terminal apparatus connected in grant free multiple access. To detect the uplink data signal, the base station apparatus 10 may be provided with, Symbol Level Interference Cancellation (SLIC) that removes interference on the basis of a demodulation result of the interference signal, Codeword Level Interference Cancellation (CWIC) that removes interference on the basis of a decoding result of the interference signal, turbo equalization, maximum likelihood (ML) and Reduced complexity maximum likelihood detection (R-ML) that searches for the most probable candidate out of the transmission signal candidates, Enhanced Minimum Mean Square Error-Interference Rejection Combining (EMMSE-IRC) that suppresses the interference signal by linear computation, or the like. Transmission power of each of the uplink data signals may be configured to be a different value at each terminal so as to generate differences in received power at the base station apparatus.

Note that, in the following description, the description is made in a case that, in the grant-free multiple access, the base station apparatus detects a non-orthogonal multiplexed uplink data signal with an applied Advanced Receiver such as turbo equalization, but the embodiment is not limited thereto as long as the uplink data signal can be detected. For example, the grant-free multiple access may be performed using multiple access based on interleaving such as Interleaved Division Multiple Access (IDMA). In this case, the base station apparatus detects (deinterleaves) the uplink data signal transmitted by each terminal apparatus on the basis of the interleave pattern applied to the uplink data signal. Further, the grant-free multiple access may be performed using code based multiple access. In this case, the base station apparatus detects the uplink data signal transmitted by each terminal apparatus on the basis of the code sequence (spreading code) multiplied to the uplink data signal.

In FIG. 1, the following uplink physical channels are included in the uplink radio communication. The uplink physical channels are used to transmit information output from a higher layer.

Physical Uplink Control Channel
Physical Uplink Shared Channel
Physical Random Access Channel The Physical Uplink Control Channel is a physical channel that is used to transmit Uplink Control Information (UCI).

The Uplink Control Information includes a positive acknowledgement (ACK) or a negative acknowledgement (NACK) for downlink data (a downlink transport block or a Downlink-Shared Channel (DL-SCH)). An ACK/NACK is also referred to as a signal indicating delivery acknowledgement, a HARQ-ACK, or a HARQ feedback.

The Uplink Control Information includes Channel State Information (CSI) for the downlink. The Channel State Information includes a Rank Indicator (RI) indicating a suited spatial multiplexing number (number of layers), a Precoding Matrix Indicator (PMI) indicating a suited precoder, and a Channel Quality Indicator (CQI) specifying a suited transmission rate. The PMI indicates a code book determined by the terminal apparatus. The code book relates to the precoding of a physical downlink shared channel. The CQI may be a modulation scheme (for example, QPSK, 16QAM, 64QAM, 256QAM, or the like) and a coding rate that are suited in a prescribed band.

The physical uplink shared channel is a physical channel used to transmit the uplink data (an uplink transport block, UL-SCH). The physical uplink shared channel may be used to transmit an ACK/NACK and/or Channel State Information for the downlink data. The physical uplink shared channel may be used to transmit the Uplink Control Information. The physical uplink shared channel is transmitted on the basis of the grant-free/the scheduling grant.

The physical uplink shared channel is used to transmit a Radio Resource Control (RRC) message. The RRC message is information/signal that is processed in a radio resource control layer. The physical uplink shared channel is used to transmit a MAC Control Element (MAC CE). The MAC CE is a signal/information that is processed (transmitted) in a Medium Access Control (MAC) layer. For example, a power headroom may be included in the MAC CE and reported via the physical uplink shared channel. Namely, a MAC CE field may be used to indicate a level of the power headroom. The uplink data may include an RRC message and a MAC CE.

The physical uplink shared channel is generated by adding a Cyclic Redundancy Check (CRC) to the uplink data. CRC parity bits are scrambled (also referred to as an EXCLUSIVE-OR operated or masked) using a sequence representing an identifier unique to the terminal apparatus.

The identifier unique to the terminal apparatus is an identifier (UE ID: also referred to as User Equipment Identifier) assigned by the base station apparatus to each terminal apparatus connected to a base station apparatus. For example, the identifier is C-RNTI, Temporary C-RNTI (T C-RNTI), and the like. The identifier is an identifier of a terminal apparatus assigned by a Controlling Radio Network Controller (CRNC). The identifier is unique within a cell controlled by the assignment CRNC. The identifier can be assigned to the terminal apparatus by the base station apparatus when the terminal apparatus accesses a new cell by the cell update procedure. The base station apparatus notifies the terminal apparatus of the identifier unique to each terminal apparatus. An identifier unique to the terminal apparatus can be included in message 2 (Random Access Response: RAR)/message 4 (Contention Resolution) in the random access procedure. An identifier unique to the terminal apparatus can also be included in the RRC message.

The identifier unique to the terminal apparatus can be associated with a signal (identifying signal) for identifying the terminal apparatus in grant-free transmission. One identifying signal is associated (linked) to one or more identifiers unique to the terminal apparatus. For example, information representing one identifying signal (a parameter for generating an identifying signal such as cyclic delay (cyclic shift) or an Orthogonal Cover Code (OOC)) is associated with one or more identifiers unique to the terminal apparatus.

The physical random access channel is used to transmit a preamble used for a random access.

In the uplink radio communication, an Uplink Reference Signal (UL RS) is used as an uplink physical signal. The uplink physical signal is not used to transmit information output from higher layers, but is used by the physical layer. The Uplink Reference Signal includes a Demodulation Reference Signal (DMRS) and a Sounding Reference Signal (SRS).

The DMRS is related to the transmission of a physical uplink shared channel or a physical uplink control channel. For example, the base station apparatus 10 uses the DMRS to perform channel compensation in a case that the physical uplink shared channel or the physical uplink control channel is demodulated. The SRS is not related to transmission of a physical uplink shared channel or a physical uplink control channel. For example, the base station apparatus 10 uses the SRS to measure an uplink channel state (CSI Measurement).

In FIG. 1, in the downlink radio communication, the following downlink physical channels are used. The downlink physical channels are used to transmit information output from the higher layer.

Physical Broadcast Channel
Physical Downlink Control Channel
Physical Downlink Shared Channel The Physical Broadcast Channel is used to broadcast a Master Information Block (MIB, a Broadcast Channel (BCH)) that is shared by the terminal apparatuses. The MIB is system information. The physical broadcast channel includes system control information to be broadcast. For example, the physical broadcast channel includes information such as a downlink system band, a System Frame Number (SFN), and the number of transmit antennas used by the eNB. The physical broadcast channel may include configuration information of a channel including a retransmission request instruction (including a hybrid automatic repeat request instruction). The configuration information of the channel including the retransmission request instruction may include information on the transmission resource of the channel, information on the transmission interval, information on the type of ACK/NACK, information on the transmission timing of an ACK/NACK, information on retransmission timing, and information indicating identifying signal. For example, the information on the transmission timing of the ACK/NACK is indicated by subframe intervals with reference to the subframe (or slot) at which the uplink data is transmitted. The information on the transmission timing of the ACK/NACK is also referred to as the ACK/NACK timer and the reception timing of the ACK/NACK by the terminal apparatus.

The physical downlink control channel is used to transmit Downlink Control Information (DCI). In the Downlink Control Information, a plurality of formats (also referred to as a DCI format) based on the intended use are defined. Each format is used depending on the intended use. The Downlink Control Information includes control information for the downlink data transmission and the control information for the uplink data transmission. The Downlink Control Information may include the information on retransmission of the uplink data (physical uplink shared channel).

The DCI format for the downlink data transmission is used for the scheduling of the physical downlink shared channel. The DCI format for the downlink data transmission is also referred to as downlink grant (or downlink assignment). The DCI format for the downlink transmission includes Downlink Control Information such as information on resource assignment of the physical downlink shared channel and information on Modulation and Coding Scheme (MCS) for the physical downlink shared channel. The DCI format for the downlink data transmission may include a Transmission Power Control (TPC) command for a physical uplink channel (for example, a physical uplink control channel, a physical uplink shared channel).

The DCI format for the downlink data transmission may include information on retransmission for the uplink data (transport block, code word). The information on retransmission of the uplink data includes information indicating an ACK/NACK (New Data Indicator (NDI)), information indicating retransmission timing, information indicating frequency resources for retransmission, information on the type of ACK/NACK, information on transmission timing of the ACK/NACK, and information indicating an identifying signal.

The DCI format for uplink data transmission is used to notify the terminal apparatus of control information on the transmission of the physical uplink shared channel. The DCI format for uplink data transmission includes information on MCS of the physical uplink shared channel, information on retransmission of the uplink data (physical uplink shared channel), information on cyclic shift for the uplink DMRS, a TPC command for the physical uplink shared channel, and a downlink Channel State Information (CSI, also referred to as reception quality information) request (CSI request). The information on the retransmission of the uplink data includes information indicating the ACK/NACK (New Data Indicator (NDI)), information on Redundancy Version (RV) of the physical uplink shared channel, the information indicating the retransmission timing, the information indicating the frequency resources for the retransmission, the information on the type of ACK/NACK, the information on the transmission timing of the ACK/NACK, and the information indicating the identifying signal (for example, the identifying signal used at the time of retransmission). The transmission timing of the ACK/NACK can be configured differently for the scheduling grant transmission and the grant-free transmission. In a case that the base station apparatus causes the terminal apparatus to transmit the uplink data on the basis of the scheduling grant, the DCI format for uplink data transmission may include information on the resource assignment of the physical uplink shared channel.

The physical downlink control channel is generated by adding a Cyclic Redundancy Check (CRC) to the Downlink Control Information. In the physical downlink control channel, the CRC parity bits are scrambled (also referred to as an EXCLUSIVE-OR operated or masked) using a prescribed identifier. The CRC parity bits are scrambled with, as an identifier, a Cell-Radio Network Temporary Identifier (C-RNTI). In the C-RNTI, an identifier unique to the grant-free transmission distinguished from the identifier for the scheduling grant may be defined. The identifier may be associated with a signal for identifying a terminal apparatus and a signal for identifying an uplink data signal in the grant-free transmission.

In the downlink radio communication in FIG. 1, the downlink physical channel may include a physical channel including a retransmission request instruction such as ACK/NACK transmission (also referred to as a physical retransmission request instruction channel, a physical ACK/NACK channel, a physical delivery acknowledgement channel). The physical retransmission request instruction channel is a physical channel used to transmit the ACK/NACK (delivery acknowledgement) for the uplink data (a transport block, a codeword) received by the base station apparatus. The physical retransmission request instruction channel may be used to transmit a HARQ indicator (a HARQ feedback, a signal indicating the delivery acknowledgement) indicating an ACK/NACK for the uplink data. The terminal apparatus reports the ACK/NACK received to a higher layer. The HARQ indicator can include an ACK indicating a successful reception (detection), a NACK indicating an unsuccessful reception, and DTX indicating absence of corresponding data. In addition to the information indicating the ACK/NACK, the physical retransmission request instruction channel may include information on retransmission such as the information indicating the retransmission timing, the information indicating the frequency resources of the retransmission, and the information on the retransmission.

The physical retransmission request instruction channel allows a bit sequence indicating the ACK/NACK and information on retransmission to be associated with an identifier unique to the grant-free transmission. For example, the physical retransmission request instruction channel may be generated by adding a Cyclic Redundancy Check (CRC) to a bit sequence and the like indicating information on the ACK/NACK and retransmission. The CRC parity bits are scrambled (also referred to as EXCLUSIVE-OR operated or masked) using a sequence representing an identifier unique to the terminal apparatus or a sequence representing an identifier common to the terminal apparatuses.

In another aspect, the physical retransmission request instruction channel may be generated by multiplying a bit sequence indicating information on the ACK/NACK or the retransmission by a sequence representing an identifier unique to the terminal apparatus or a sequence representing the identifier common to the terminal apparatuses. The bit sequence indicating information on the ACK/NACK and the retransmission is spread by a sequence representing an identifier unique to the terminal apparatus or a sequence associated with a sequence representing the identifier common to the terminal apparatuses.

The identifier common to the terminal apparatuses can be associated with the resource with which the uplink data is transmitted. For example, the identifier common to the terminal apparatuses is associated with the subframe number/the slot number/the symbol number/the system frame number where the uplink data has been transmitted. The identifier common to the terminal apparatuses is associated with the frequency resource with which the uplink data has been transmitted. The identifier common to the terminal apparatuses is generated (as a generation parameter) using the subframe number/the slot number/the symbol number/the frequency resource where the uplink data has been transmitted. The base station apparatus and the terminal apparatus calculate a common identifier for the terminal apparatuses by using the subframe number/the slot number/the symbol number/the frequency resource where the uplink data has been transmitted. For example, assuming that the identifier common to the terminal apparatuses is 1 plus the subframe number ($0 \leq$ subframe number$<10$) of the subframe at which the uplink data is transmitted, the base station apparatus can calculate the identifier common to the terminal apparatuses by recognizing the subframe number of the subframe at which the uplink data is received. Note that an index indicating the frequency resource with which the uplink data has been transmitted may be included in the calculation formula of the sequence associated with the identifier common to the terminal apparatuses.

The identifier common to the terminal apparatuses may be associated with the subframe number/the slot number/the symbol number/the system frame number where the ACK/NACK is transmitted. The identifier common to the terminal apparatuses may be associated with the frequency resource with which the ACK/NACK is transmitted. The identifier common to the terminal apparatuses is generated using the subframe number/the slot number/the symbol number/the frequency resource where the ACK/NACK is transmitted. For example, assuming that the identifier common to the terminal apparatuses is 1 plus the subframe number (0≤subframe number<10) of the subframe at which the ACK/NACK is transmitted, the base station apparatus can calculate the identifier common to the terminal apparatuses by recognizing the subframe number of the subframe at which the ACK/NACK is transmitted. Note that, an index indicating a frequency resource with which the ACK/NACK is transmitted may be included in a calculation formula of a sequence associated with the identifier common to the terminal apparatuses.

The identifier common to the terminal apparatuses may be associated with the resource with which the identifying signal has been transmitted. For example, the identifier common to the terminal apparatuses may be associated with the subframe number/the slot number/the system frame number where the identifying signal has been transmitted. The identifier common to the terminal apparatuses may be associated with the frequency resource with which the identifying signal has been transmitted. The identifier common to the terminal apparatuses is generated using (as the generation parameter) the subframe number/the slot number/the frequency resource with which the identifying signal has been transmitted. The base station apparatus and the terminal apparatus calculate the identifier common to the terminal apparatuses by using the subframe number/the slot number/the frequency resource where the identifying signal has been transmitted. For example, assuming that the identifier common to the terminal apparatuses is 1 plus the subframe number (0≤subframe number<10) of the subframe at which the identifying signal has been transmitted, the base station apparatus can calculate the identifier common to the terminal apparatuses by recognizing the subframe number of the subframe at which the identifying signal has been received. In this manner, a parameter common to the terminal apparatuses to be multiplexed may be regarded as a generation parameter of the identifier common to the terminal apparatuses. Note that an index indicating the frequency resource with which the identifying signal has been transmitted may be included in the calculation formula of the identifier common to the terminal apparatuses.

The base station apparatus notifies the terminal apparatuses of the parameter common to the terminal apparatuses, and the parameter may be shared by the base station apparatus and the terminal apparatuses. For example, in step S201/S203 in FIG. 3, the base station apparatus transmits the identifier common to the terminal apparatuses (or a parameter for calculating the identifier) to the terminal apparatus. In another aspect, the base station apparatus may transmit the identifier common to the terminal apparatuses (or a parameter for calculating the identifier) to the terminal apparatuses by using the Downlink Control Information. Note that, the identifier unique to the terminal apparatus/the identifier common to the terminal apparatuses may be defined as an identifier unique to the grant-free transmission distinguished from the identifier for the scheduling grant.

The resource with which the physical retransmission request instruction channel is transmitted may be associated with the resource with which the uplink data has been transmitted in the grant-free multiple access. For example, the resource with which the physical retransmission request instruction channel is transmitted is associated with the subframe number/the slot number/the symbol number/the system frame number where the uplink data has been transmitted in the frequency domain of the resource. The resource with which the physical retransmission request instruction channel is transmitted may be associated with the frequency resource with which the uplink data has been transmitted in the frequency domain of the resource. The base station apparatus and the terminal apparatus calculate resources with which the physical retransmission request instruction channel is transmitted by using the subframe number/the slot number/the symbol number/the frequency resource index where the uplink data has been transmitted. Further, the resource with which the physical retransmission request instruction channel is transmitted may be associated with the downlink system bandwidth (for example, the number of resource blocks of the system bandwidth) in the frequency domain of the resource. For example, the resource with which the physical retransmission request instruction channel is transmitted is calculated by performing modulo operation, with the number of resource blocks of the downlink system bandwidth, on the smallest frequency resource block index out of the frequency resource blocks with which the uplink data has been transmitted. The base station apparatus can calculate the resource with which the physical retransmission request instruction channel is transmitted by recognizing the frequency resource with which the uplink data has been received.

The resource with which the physical retransmission request instruction channel is transmitted may be associated with a signal (identifying signal) for identifying the terminal apparatus in the grant-free multiple access. For example, the resource with which the physical retransmission request instruction channel is transmitted is associated with the subframe number/the slot number/the system frame number where the identifying signal has been transmitted in the frequency domain of the resource. The resource with which the physical retransmission request instruction channel is transmitted may be associated with the frequency resource with which the identifying signal has been transmitted in the frequency domain of the resource. The base station apparatus and the terminal apparatus calculate resources with which the physical retransmission request instruction channel is transmitted by using the subframe number/slot number/frequency resource index where the identifying signal has been transmitted. Further, the resource with which the physical retransmission request instruction channel is transmitted may be associated with the downlink system bandwidth (for example, the number of resource blocks of the system bandwidth) in the frequency domain of the resource. For example, the resource with which the physical retransmission request instruction channel is transmitted is calculated by performing modulo operation, with the number of resource blocks of the downlink system bandwidth, on the smallest frequency resource block index out of the frequency resource blocks with which the identifying signal has been transmitted. The base station apparatus can calculate the resource with which the physical retransmission request instruction channel is transmitted by recognizing the frequency resource with which the identifying signal has been received.

In this manner, in the grant-free multiple access, the base station apparatus and the terminal apparatus can efficiently share the configuration on the physical retransmission request instructing channel, by associating the sequence multiplied to the physical retransmission request instruction channel/the sequence scrambled (masked) to the physical retransmission request instruction channel/a resource assigned to the physical retransmission request instruction channel, with the identifying signal of the terminal apparatus/a parameter on the uplink data/a transmission resource of the uplink data.

The physical retransmission request instruction channel can be used to transmit the delivery acknowledgement for the uplink data transmitted on the basis of the delivery acknowledgement/the scheduling grant for the uplink data in the grant-free transmission. The physical retransmission request instruction channel can be configured differently depending on whether it is used for the delivery acknowledgement for the uplink data in the grant-free transmission or for the delivery acknowledgement for the uplink data transmitted on the basis of the scheduling grant. For example, the base station apparatus may be configured such that, for one of the delivery acknowledgement, a physical retransmission request instruction channel in which multiplication by the spreading code sequence is performed and a plurality of ACK/NACKs are transmitted is used, and for the other one of the delivery acknowledgement, a physical retransmission request instruction channel in which a plurality of ACK/NACKs generated by adding CRC is used. The physical retransmission request instruction channel may be included in one DCI format of the physical downlink control channel.

The physical downlink shared channel is used to transmit downlink data (a downlink transport block, DL-SCH). The physical downlink shared channel is used to transmit a system information message. The system information message may include a system information block unique to the grant-free transmission. For example, the system information block unique to the grant-free transmission may include configuration information such as an uplink resource (frequency band, or the like) for performing the grant-free transmission, an uplink resource for transmitting the ACK/NACK, and the type of ACK/NACK. Note that part or all of the system information message can be included in the RRC message.

The physical downlink shared channel is used to transmit an RRC message. The RRC message can include a message for configuration information on the grant-free transmission (also referred to as grant-free transmission configuration assist information). The RRC message transmitted from the base station apparatus may be common (cell-specific) to a plurality of terminal apparatuses in a cell. Namely, information common to user devices in the cell is transmitted using cell-specific RRC messages. The RRC message transmitted from the base station apparatus may be a dedicated message to a given terminal apparatus (also referred to as dedicated signaling). In other words, user-equipment-specific information (unique to user equipment) is transmitted using a message dedicated to the given terminal apparatus. Furthermore, the RRC message transmitted from the base station apparatus may be a message dedicated to the grant-free transmission. Namely, information unique to the grant-free transmission may be transmitted using a message dedicated to grant-free transmission.

The physical downlink shared channel is used to transmit MAC CE. The RRC message and/or the MAC CE is also referred to as higher layer signaling.

In the downlink radio communication in FIG. 1, a Synchronization signal (SS) and a Downlink Reference Signal (DL RS) are used as downlink physical signals. The downlink physical signals are not used to transmit information output from the higher layers, but are used by the physical layer.

The Synchronization Signal is used for the terminal apparatus to take synchronization in the frequency domain and the time domain in the downlink. The Downlink Reference Signal is used for the terminal apparatus to perform channel compensation on a downlink physical channel. For example, the Downlink Reference Signal is used to demodulate the physical broadcast channel, the physical downlink shared channel, and the physical downlink control channel. The Downlink Reference Signal may be used for the terminal apparatus to perform measurement of the downlink Channel State Information. Also, the reference signal used for demodulating various channels may be different from the reference signal used for performing measurement (for example, DMRS: Demodulation Reference Signal, CRS: Cell-specific Reference Signal in LTE).

The downlink physical channel and the downlink physical signal are collectively referred to as a downlink signal. The uplink physical channel and the uplink physical signal are also collectively referred to as an uplink signal. The downlink physical channels and the uplink physical channels are collectively referred to as physical channels. The downlink physical signals and the uplink physical signals are also collectively referred to as physical signals.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The Transport Block is a unit of data that the MAC layer delivers to the physical layer. In the physical layer, the Transport Block is mapped to a codeword, and coding processing is performed for each codeword.

Figure 2:
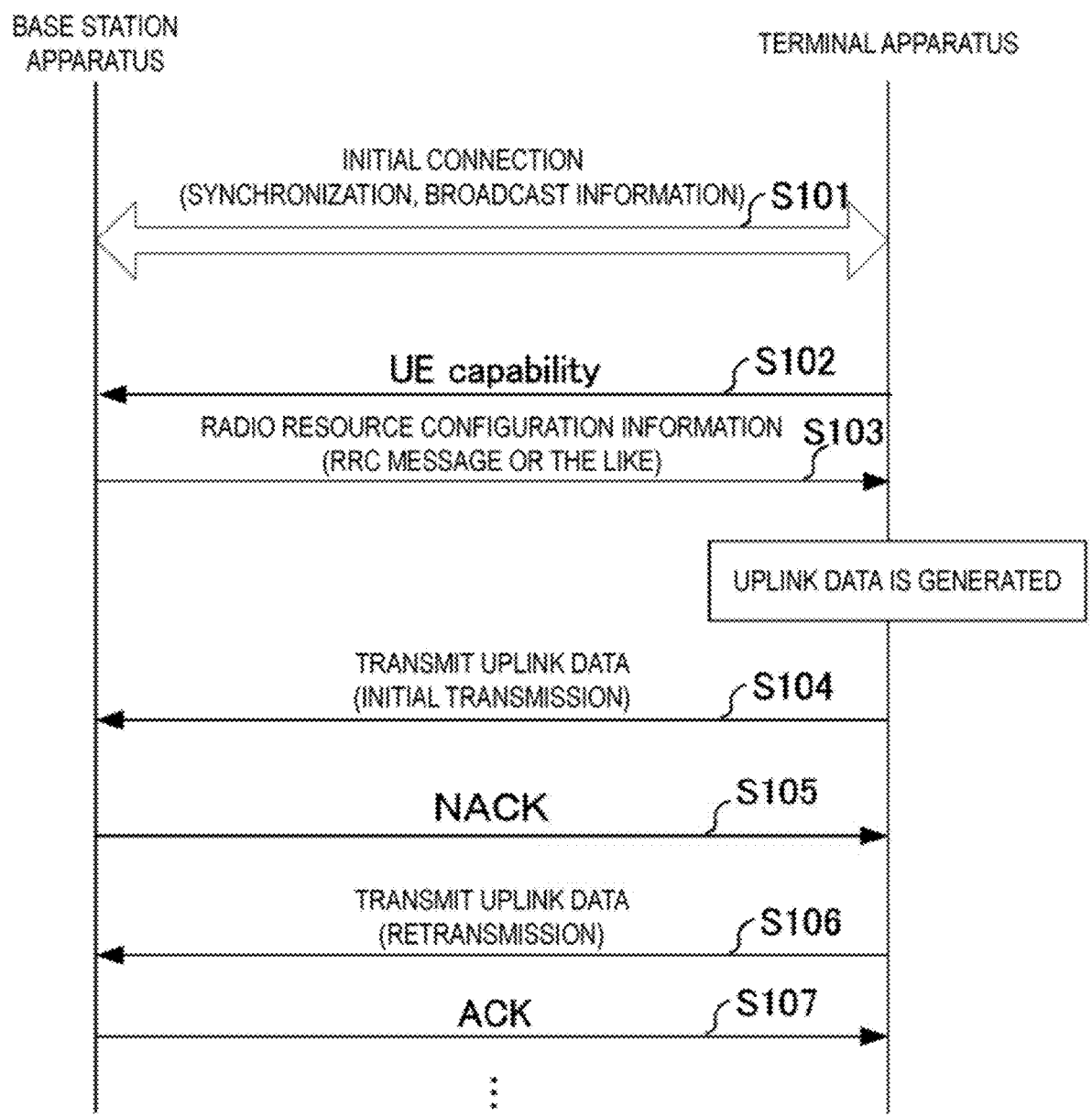
FIG. 2 is a diagram illustrating an example of a sequence between a base station apparatus and a communication apparatus in a multiple access based on grant-free according to the first embodiment.

FIG. 2 is a diagram illustrating an example of a sequence between the base station apparatus and the communication apparatus in the multiple access using the grant-free according to this embodiment. The base station apparatus 10 periodically transmits the Synchronization Signal in the downlink in accordance with a prescribed radio frame format. Also, the base station apparatus 10 transmits a broadcast channel. The terminal apparatus performs an initial connection using the Synchronization Signal, the broadcast channel, or the like (S101). The terminal apparatus performs frame synchronization and symbol synchronization in the downlink by using the Synchronization Signal. Using the broadcast channel, the terminal apparatus specifies system information such as downlink system bandwidth, System Frame Number (SFN), the number of antenna ports, and configurations related to channels including a physical retransmission request. In a case that configuration information for the grant-free transmission is included in the broadcast channel, the terminal apparatus specifies a configuration for the grant-free transmission in the connected cell. The configuration information on the grant-free transmission may include information indicating that the base station apparatus supports the grant-free transmission, an area in which the grant-free transmission is possible, and information on terminal apparatus identification (such as information indicating an identifying signal).

In S101, the terminal apparatus can perform random access in order to obtain resources for uplink synchronization and RRC connection request. The terminal apparatus transmits a physical random access channel (the random access preamble) to the base station apparatus. The base station apparatus that received the physical random access channel transmits a random access response. The base station apparatus may include information indicating a UE ID (for example, T C-RNTI)/identifier common to the terminal apparatuses/identifying signal in the random access response. Upon receiving the random access response, the terminal apparatus transmits an higher layer connection request (RRC connection request, message 3). Upon receiving the higher layer connection request, the base station apparatus transmits control information for higher layer connection (RRC connection setup, Contention resolution, message 4) to the terminal apparatus. The base station apparatus may include, in the control information for the higher layer connection, information indicating a UE ID (for example, T C-RNTI)/identifier common to the terminal apparatuses/identifying signal.

Next, the terminal apparatus transmits UE Capability (S102). Using the UE Capability, the base station apparatus can identify whether the terminal apparatus supports the grant-free multiple access. For example, the UE Capability is transmitted using an RRC message or the like.

The base station apparatus transmits the configuration information on radio resource control to the terminal apparatus (S103). The configuration information for the radio resource control is transmitted using the RRC message or the like. The configuration information on the radio resource control may include configuration information on the grant-free transmission. The configuration information on the grant-free transmission may include an area in which the grant-free transmission is possible, information on terminal apparatus identification, the information indicating the retransmission timing, the information indicating the frequency resources for the retransmission, the information indicating the ACK/NACK transmission timing, the information indicating the ACK/NACK type, and the information indicating the identifying signal. In this case, the terminal apparatus identifies the configuration information on the grant-free transmission by using the configuration information on the radio resource control. Note that some or all of the configuration information on the grant-free transmission may be notified by the Downlink Control Information.

In a case that the uplink data is generated, the terminal apparatus supporting the grant-free transmission transmits the uplink data without obtaining the UL Grant from the base station apparatus (S104). In S104, the terminal apparatus can transmit the identifying signal assigned to the terminal apparatus itself and the uplink data. The base station apparatus identifies the terminal apparatus using the identifying signal and detects the uplink data transmitted by the terminal apparatus. On the basis of the ACK/NACK transmission timing, the base station apparatus transmits the ACK/NACK for the uplink data (S105). The base station apparatus can use the physical downlink control channel/the physical retransmission request instruction channel for the ACK/NACK transmission. In a case that the base station apparatus correctly detects the uplink data, the base station apparatus transmits an ACK to the terminal apparatus. On the other hand, in a case that the base station apparatus cannot correctly detect the uplink data, the base station apparatus transmits a NACK to the terminal apparatus (S105 in FIG. 2 is a case where the base station apparatus transmits the NACK). In step S105, the base station apparatus may transmit retransmission information such as the information indicating the retransmission timing and the information indicating the frequency resources for the retransmission. A terminal apparatus multiplexed with the same time resource and frequency resource in S104 may perform transmission, in retransmission, using a time resource/frequency resource different from the initial transmission.

In a case that the terminal apparatus receives the NACK in S105, the terminal apparatus retransmits the same data (data bits and parity bits transmitted in the initial transmission) as the uplink data (S106). The retransmission uplink data may be data including both the data bits and parity bits transmitted in the initial transmission and data bits and parity bits not transmitted in the initial transmission. In S105, in a case that the terminal apparatus receives the ACK, the terminal apparatus transmits (initial transmission) new uplink data.

In the case of retransmission, the base station apparatus performs detection processing using the uplink data (retransmission) received in S106. The base station apparatus transmits the ACK/NACK on the basis of the result of the detection processing (S107). S107 in FIG. 2 is a case where the ACK is transmitted. Note that, the base station apparatus may perform the detection processing (Chase synthesis or the like) using the uplink data (initial transmission) received in S104 and the uplink data (retransmission) received in S106. For the retransmission of the uplink data in the grant-free transmission, it is possible to use a non-adaptive retransmission method (a method in which the coding rate and the modulation method of the uplink data are not changed between the initial transmission and the retransmission).

Figure 3:
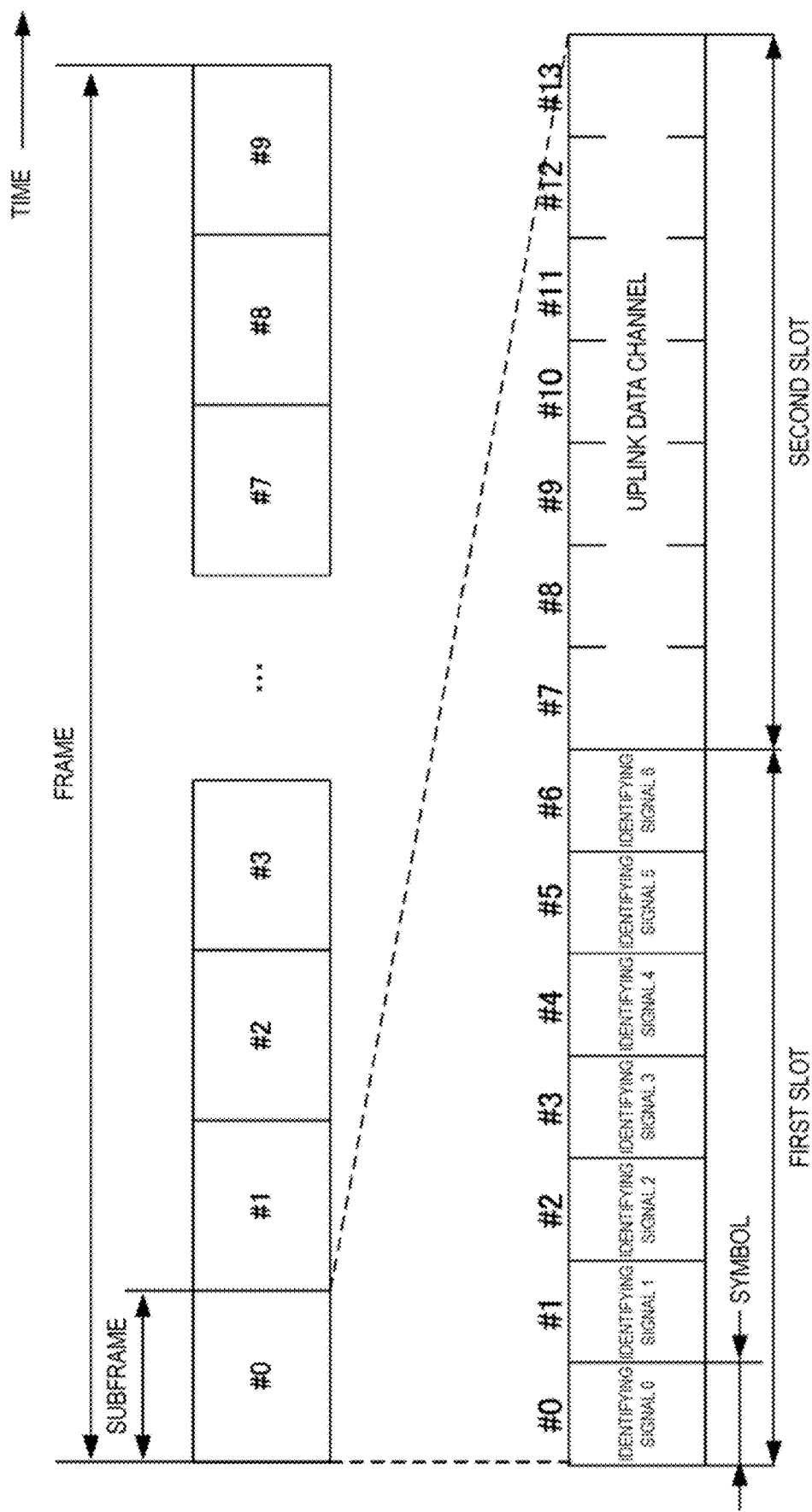
FIG. 3 is a diagram illustrating an example of an uplink radio frame format in a multiple access based on grant-free according to the first embodiment.

FIG. 3 is a diagram illustrating an example of an uplink radio frame format in a multiple access using the grant-free according to this embodiment. In FIG. 3, one radio frame is constituted by 10 subframes. Each subframe consists of two slots. Each slot consists of seven SC-FDMA symbols. Namely, each subframe consists of 14 SC-FDMA symbols. In FIG. 3, in the first slot, an identifying signal is arranged for each SC-FDMA symbol. In the second slot, a channel including the uplink data is assigned. For example, the uplink data of each terminal apparatus is assigned in units of a slot (the channels including the uplink data of each terminal apparatus are transmitted over the second slot). The communication system according to the present embodiment allows the uplink data of the terminal apparatus to which the identifying signals 0 to 6 are assigned in the first slot to be non-orthogonal multiplexed in the second slot. In FIG. 3, the identifying signal is arranged in units of a symbol, and the uplink data is assigned in units of a slot, but the present invention is not limited thereto, and the embodiment according to the present invention includes a configuration in which the identifying signal and the uplink data are arranged in units of a prescribed time.

The identifying signal is used for the base station apparatus to identify the terminal apparatus that transmitted the uplink data. The terminal apparatus can, by means of the identifying signal, notify the base station apparatus that the uplink data has been transmitted and of the resource (time resource/frequency resource) with which the uplink data is transmitted. A predetermined known sequence in the base station apparatus and the terminal apparatus is used as the identifying signal. For example, in FIG. 3, a known sequence different for each SC-FDMA symbol is assigned as an identifying signal in the frequency domain (identifying signal sequences $c_0, c_1, \ldots, c_{K_{i-1}}$ (Ki is the identifying signal sequence length) are assigned to frequency resources in one SC-FDMA symbol). In this case, the base station apparatus can identify seven terminal apparatuses. The known sequence may be further subjected to predetermined phase rotation, cyclic shift, interleaving, OCC (Orthogonal Cover Code), and the like. The base station apparatus can identify the terminal apparatus according to the known sequence pattern, the phase rotation pattern, the Cyclic shift pattern, the interleave pattern, and the OCC pattern. Thus, the number of terminal apparatuses that can be identified may be increased. Note that, in FIG. 3, the area in which the identifying signal is arranged and the area in which the uplink data is arranged are assigned in units of a slot, but not limited to this, both areas may be assigned in units of a subframe. Further, one identifying signal may be arranged over a plurality of SC-FDMA symbols.

Note that the reference signal can be arranged in any one of the SC-FDMA symbols in each subframe. The reference signal may be obtained by multiplying the known sequence as a base by any of the identifying signals. The base station apparatus performs channel estimation between the base station apparatus and the transmission terminal apparatus, using the reference signal. The base station apparatus can perform signal detection such as turbo equalization of the uplink data using the channel estimation value.

Figure 4:
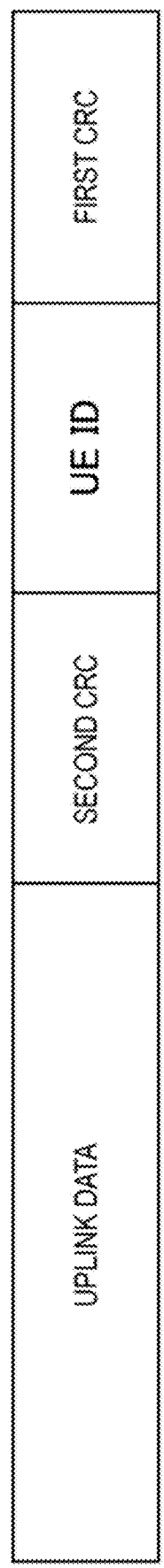
FIG. 4 is a diagram illustrating an example of a format of an uplink data channel according to the first embodiment.

FIG. 4 is a diagram illustrating an example of an uplink data channel according to the present embodiment. The format can be used to transmit the physical uplink shared channel in the grant free. The format includes an uplink data part (uplink data field), a UE ID part (UE ID field), a first CRC part (first CRC field), and a second CRC part (second CRC field). In the uplink data part, uplink data bits $x_0$, $x_1, \ldots, x_{Kd-1}$ (Kd is the uplink data bit length) generated from the higher layer are stored. In the UE ID part, bits $y_0$, $y_1, \ldots, y_{Ku-1}$ (Ku is the bit length of the UE ID, Ku=K1P) are stored. In the first CRC part, first CRC parity bits $pp_0$, $pp_1, \ldots, pp_{K2P}$ (K2P is the second CRC parity bit length, K2P=Ki) (also referred to as first error detection bits) generated from the identifier stored in the UE ID part with a cyclic generator polynomial are stored. In the second CRC part, second CRC parity bits $p_0, p_1, \ldots, p_{K1P-1}$ (K1P is the first CRC parity bit length) (also referred to as second error detection bits) generated from the uplink data bits with a cyclic generator polynomial are stored.

The uplink data is associated with an identifying signal. The UE ID of each terminal apparatus is associated with an identifying signal sequence. For example, the first CRC parity bit sequence pp is scrambled using the identifying signal sequence c (which may be a sequence generated by parameters relating to the identifying signal sequence). The second CRC parity bit sequence p is scrambled (also referred to as EXCLUSIVE-OR operated or masked) using a sequence y representing an identifier stored in the UE ID part. Note that the second CRC parity bit sequence p may be scrambled using the identifying signal sequence c. Note that arrangement order in the uplink data channel of the uplink data part (uplink data field), the UE ID part (UE ID field), the first CRC part (first CRC field) and the second CRC part (second CRC field) is not limited to the order as illustrated in FIG. 4, and may be constituted by these permutations.

Figure 5:
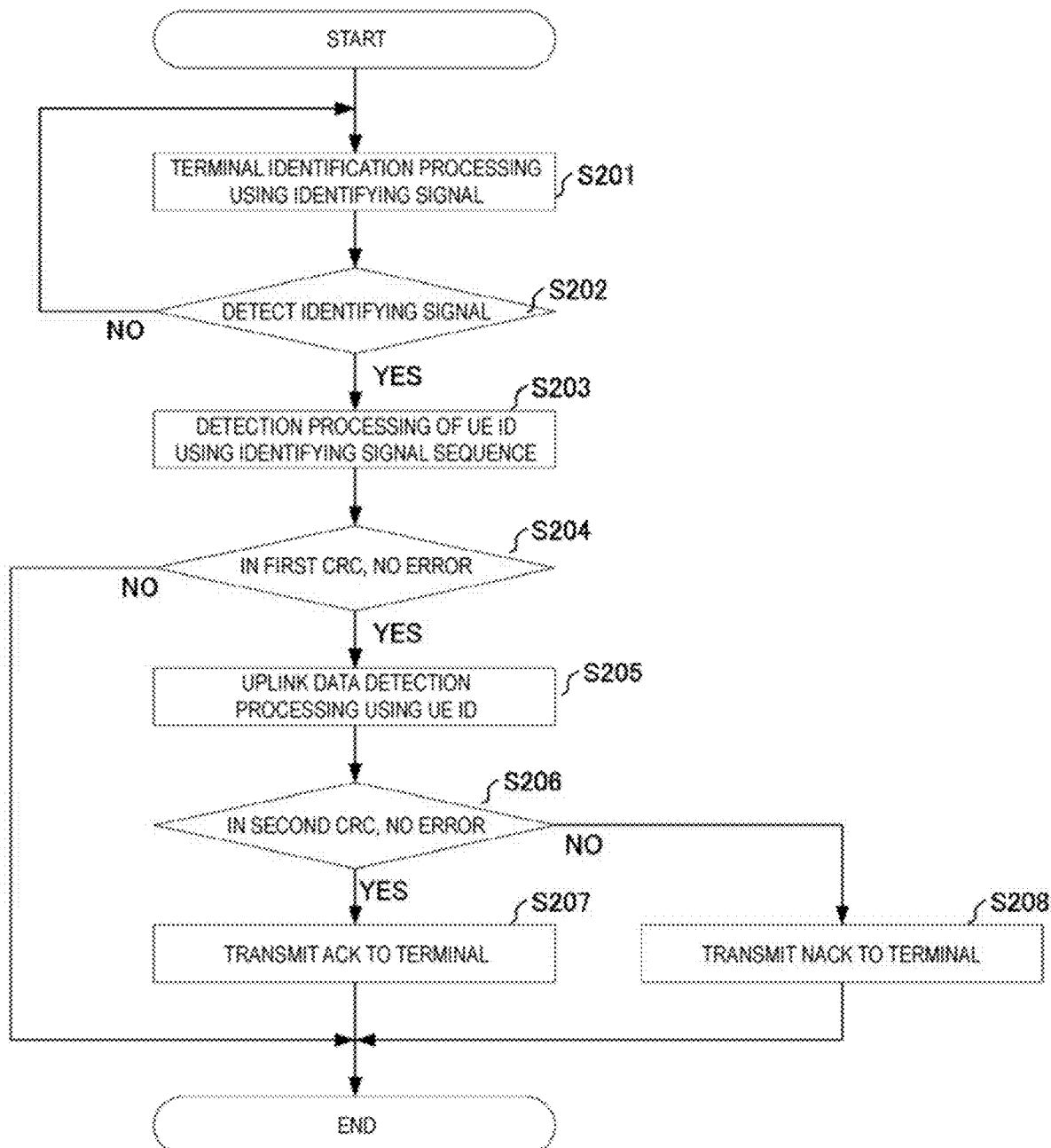
FIG. 5 is a diagram illustrating an example of a flow chart of an uplink data detection according to the first embodiment.

FIG. 5 is a diagram illustrating an example of a flow chart of an uplink data detection according to the present embodiment. In the first slot, the base station apparatus identifies which terminal apparatus has transmitted the uplink data by using the identifying signal (S201, also referred to as coarse terminal identification processing). For example, the base station apparatus performs identification processing in each symbol by correlation processing using an identifying signal sequence. In a case that the base station apparatus determines that there is a terminal apparatus that has transmitted the uplink data (reception of (detection of) an identifying signal in the first slot) (YES in S202), the base station apparatus performs uplink data detection processing of the terminal apparatus in the second slot (S203 to S208). The base station apparatus performs signal detection such as turbo equalization on the uplink data channel by using the terminal identification processing and the result of channel estimation.

The base station apparatus performs descrambling processing (also referred to as EXCLUSIVE-OR operation or masking) on the first CRC using the received identifying signal sequence (S203, also referred to as fine terminal identification processing). In a case that an error is detected in the first CRC (NO in S204), the base station apparatus determines that the terminal identification processing based on the identifying signal has failed.

In a case that an error is not detected in the first CRC (YES in S204), the base station apparatus determines that the identification of the terminal apparatus to which the identifier stored in the UE ID part is assigned is successful. The base station apparatus can hold in advance an association list between the identifying signal and the UE ID. A step may be added in which the base station apparatus determines whether the identifier stored in the UE ID part is correct using the association list.

In the case of YES in S204, the base station apparatus performs detection processing of the uplink data stored in the uplink data part by using the UE ID (S205). Specifically, the base station apparatus descrambles the second CRC using the UE ID. In a case that an error is detected in the second CRC (NO in S206), the base station apparatus determines that the uplink data could not be correctly received and transmits a NACK to the terminal apparatus that transmitted the uplink data (S208). In a case that no error is detected in the second CRC (YES in S206), the base station apparatus determines that the uplink data has been correctly received, and transmits an ACK to the terminal apparatus that transmitted the uplink data (S207). In S207/S208, the base station apparatus may transmit the ACK/NACK for each terminal apparatus, or may transmit the ACK/NACKs in a batch for the uplink data received in a prescribed time resource (for example, the same subframe).

Upon receiving the NACK for the uplink data in S208, the terminal apparatus retransmits the data related to the uplink data. The data related to the uplink data may be the same as the uplink data (the data bits and parity bits transmitted in the initial transmission) transmitted in the initial transmission, or data not transmitted in the initial transmission (the data bits and parity bits not transmitted in the initial transmission). Also, the data related to the uplink data may be data including both the uplink data transmitted in the initial transmission and the data not transmitted in the initial transmission. In this case, the base station apparatus that received the retransmission data performs signal detection processing using the uplink data (initial transmission) and the uplink data (retransmission). In the detection processing, the base station apparatus can use Chase synthesis and Incremental Redundancy (IR).

In a case that an error is detected in the first CRC (NO in S204), the base station apparatus does not transmit the NACK for the uplink data. Namely, the terminal apparatus that has transmitted the uplink data does not receive the ACK/NACK. In this case, the terminal apparatus determines that the terminal identification by the base station apparatus was a failure after the ACK/NACK reception timing has passed (in a case that no ACK/NACK was received by the ACK/NACK reception timing) (regarded as a NACK due to the terminal identification failure).

A terminal that has not received the ACK/NACK for the uplink data by the ACK/NACK reception timing retransmits the same data as the uplink data (the data bits and the parity bits transmitted in the initial transmission). The uplink data (retransmission) may be data including both the data bits and parity bits transmitted in the initial transmission and the data bits and parity bits not transmitted in the initial transmission.

In this case, the base station apparatus that received the retransmission data performs the signal detection processing using the uplink data (initial transmission).

Figure 6:
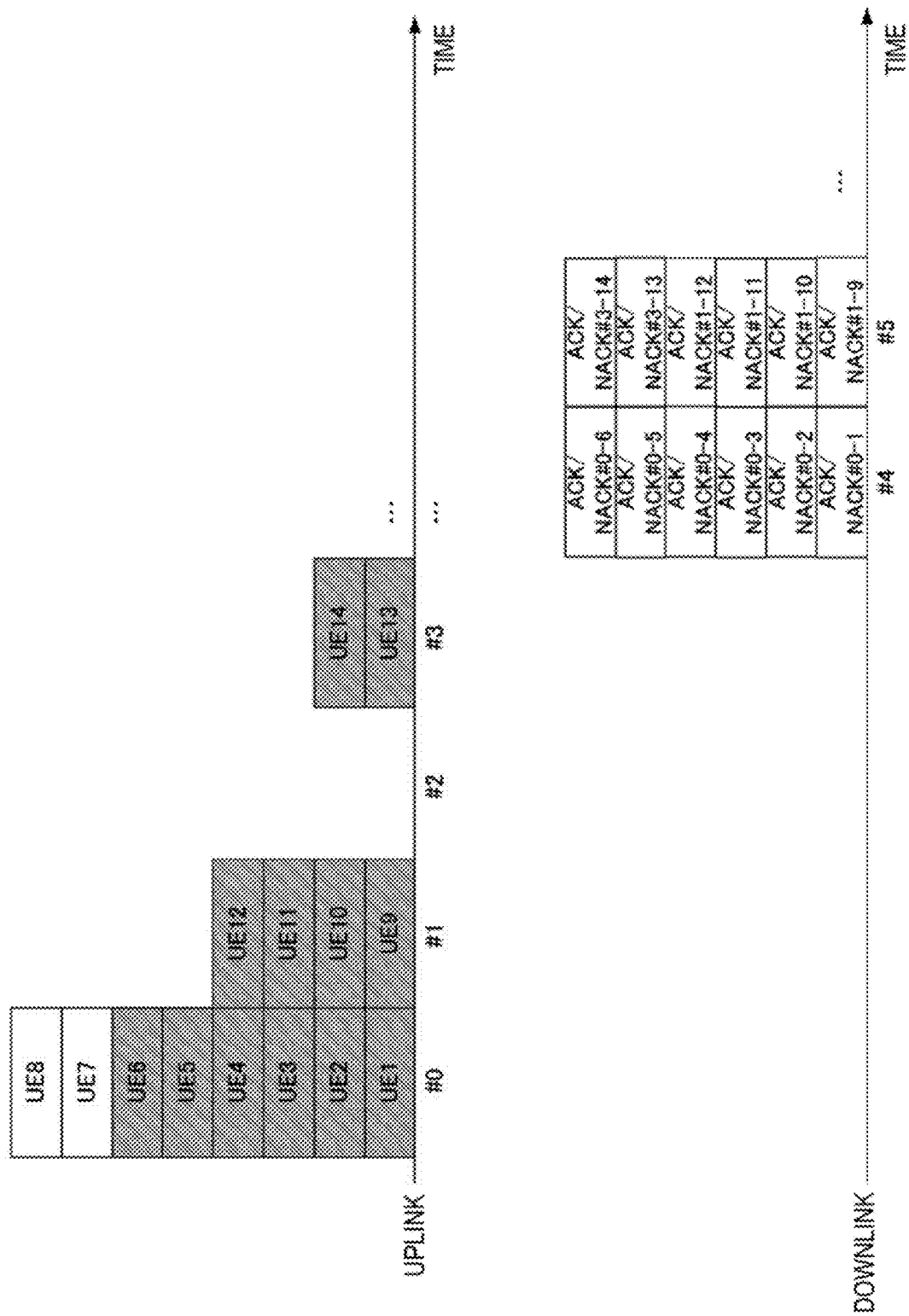
FIG. 6 is a diagram illustrating an example of ACK/NACK transmission for uplink data according to the first embodiment.

FIG. 6 is a diagram illustrating an example of ACK/NACK transmission for the uplink data according to the present embodiment. An ACK/NACK #m-n is an ACK/NACK for UE #n received at a subframe #m. FIG. 6 is a case in which an ACK/NACK is transmitted for each terminal apparatus. UE 1 to UE 14 in FIG. 6 correspond to the uplink data (including identifying signals) of the terminal apparatuses 20-1 to 20-14. A subframe is a time unit at which the terminal apparatus assigns the uplink data.

Let us assume that the base station apparatus detects the uplink data UE 0 to UE 14 transmitted by the respective terminal apparatus in the terminal identification processing using the identifying signal (S202 in FIG. 5). Further, the base station apparatus is assumed to have identified the uplink data UE 0 to UE 12 (the area hatched diagonally right up in FIG. 6) out of the uplink data UE 0 to UE 14 in the terminal identification processing using the first CRC (S203 in FIG. 5). The base station apparatus determines whether it correctly received the uplink data UE 0 to UE 12 (S206 in FIG. 5). In this case, on the basis of the detection result, the base station apparatus transmits in the downlink an ACK or a NACK for UE 0 to UE 12 (the ACK/NACK #0-1 to the ACK/NACK #0-6, the ACK/NACK #1-9 to the ACK/NACK #1-12, the ACK/NACK #3-13 to the ACK/NACK #3-14). In the terminal identification processing using the first CRC, the base station apparatus does not transmit a NACK for UE 7 and UE 8 which could not be correctly detected. Note that FIG. 6 illustrates a case where the transmission timing of an ACK/NACK #3 is configured to ½ of the transmission timing of an ACK/NACK #1.

In FIG. 6, although the base station apparatus transmits an ACK/NACK for each terminal apparatus, the base station apparatus can transmit ACK/NACKs in a batch for the uplink data received at the same subframe. In one embodiment, the base station apparatus regards a plurality of terminal apparatuses that transmitted the uplink data multiplexed within a prescribed time unit as a group of terminal apparatuses. The base station apparatus transmits the ACK/NACKs for the group in a batch. For example, in a case that the base station apparatus correctly detects all the uplink data of UE 1 to UE 6, the base station apparatus transmits the ACKs in a batch in the downlink. On the other hand, in a case that the base station apparatus could not detect any of the uplink data UE 1 to UE 8, the base station apparatus transmits NACKs in a batch in the downlink. In another aspect, the base station apparatus regards a plurality of terminal apparatuses having the same identifying signal sequence as a group of terminal apparatuses. The base station apparatus transmits the ACK/NACKs for the group in a batch.

As described above, in the communication system according to the present embodiment, the base station apparatus performs uplink data detection using the terminal identification using the identifying signal and the UE ID. In addition, since the ACK/NACK is transmitted, the terminal apparatus knows the reason why the uplink data could not be transmitted. This enables, in the grant-free multiple access, efficient detection of the uplink data while preventing degradation of terminal identification accuracy.

Next, an aspect of the retransmission timing (S106 in FIG. 2) of the uplink data will be described. The base station apparatus transmits information indicating retransmission timing of the uplink data to the terminal apparatus in the system information/RRC message/Downlink Control Information (S103 in FIG. 2). The base station apparatus can also transmit the information indicating the retransmission timing to the terminal apparatus using the physical retransmission request instruction channel (S105 in FIG. 2). For example, the information indicating the retransmission timing is configured as the transmission interval (subframe interval, slot interval, frame interval) with reference to the uplink data transmission time in S104 (for example, the end of the subframe at which the physical uplink shared channel is assigned). The information indicating the retransmission timing may be configured as the transmission interval (subframe interval, slot interval, frame interval) with reference to the ACK/NACK transmission time in S105 (for example, the end of the subframe at which the physical retransmission request instruction channel is assigned).

The information indicating the retransmission timing of the uplink data can be a group of retransmission timings constituted by a plurality of transmission intervals (for example, transmission intervals are {1, 2, 4, 8, . . . } ms). In S105, the terminal apparatus that received the NACK selects any one of the retransmission interval out of the group of retransmission timings. The terminal apparatus retransmits the uplink data at the selected retransmission interval (S106).

In another aspect, the information indicating the retransmission timing of the uplink data is configured as the reference time and an offset value with respect to the reference time. For example, the reference time/the offset value with respect to the reference time are notified to the terminal apparatus in the system information/the RRC message/the Downlink Control Information/the physical retransmission request instruction channel. The base station apparatus may transmit the reference time and the offset value with respect to the reference time on the same channel or on different channels. For example, the reference time is transmitted in the system information/the RRC message, and the offset value is transmitted in the Downlink Control Information/the physical retransmission request instruction channel. The channel reference time/the offset value with respect to the reference time may be constituted by a group of retransmission timings constituted by a plurality of transmission intervals (for example, reference times are {4, 8, 12 . . . } ms, offset values are {−2, −1, 0, 1, 2, 4, 8, . . . } ms).

Here, let us assume that the base station apparatus has transmitted the reference time of 4 ms and the offset values −2, −1, 0, 1, 2, 4, 8, . . . ms as the group of retransmission timing, to the terminal apparatus. Upon receiving a NACK, the terminal apparatus selects one of the offset values. The terminal apparatus retransmits the uplink data at the retransmission interval obtained from the reference time plus the selected offset value (S106). The offset value may be randomly selected by the terminal apparatus or may be instructed by the base station apparatus.

For example, the base station apparatus notifies each terminal apparatus of the group of retransmission timings (transmission interval/reference time and offset value) in the RRC message or the like. The transmission interval/reference time and offset value may be linked to the retransmission timing index. In this case, the base station apparatus notifies each terminal apparatus of the retransmission timing index.

In the case of a configuration in which the transmission intervals/offset values are selected at random, the terminal apparatus receiving the NACK retransmits the uplink data on the basis of the transmission interval/offset value selected from the group of retransmission timings.

In the case of a configuration in which the base station apparatus instructs the retransmission timing, the base station apparatus notifying a NACK to the terminal apparatus transmits one or more transmission intervals/offset values out of the group of retransmission timings to each terminal apparatus, using the physical retransmission request instruction channel. Upon receiving the transmission intervals/offset values, the terminal apparatus retransmits the uplink data on the basis of the transmission interval/offset value. The base station apparatus can notify different transmission intervals/offset values between terminal apparatuses to which a NACK is notified. Note that, upon receiving the retransmission timing index, the terminal apparatus retransmits the uplink data on the basis of the transmission interval/offset value linked to the retransmission timing index.

The base station apparatus can configure a different retransmission timing for each terminal apparatus. For example, the base station apparatus configures a different group of retransmission timings for each terminal apparatus. The base station apparatus configures the reference time and the offset value with respect to the reference time that are different for each terminal apparatus.

In the communication system according to the present embodiment, a range of the group of retransmission timings can be varied according to the number of times of retransmission. For example, the base station apparatus can widen the range of the group of retransmission timings, as the number of times of retransmission increases. The base station apparatus can widen the range of the offset value, as the number of retransmissions increases.

In a case that the base station apparatus notifies each terminal apparatus of a NACK for the uplink data transmitted with the same time resource, the base station apparatus may be configured such that the retransmission by each terminal apparatus is performed by transmitting the uplink data using transmission power/spreading code/interleave pattern/Demodulation Reference Signal which are different for each terminal apparatus. In this case, it is preferable that the orthogonality of the transmission power/spreading code/interleave pattern/Demodulation Reference Signal be maintained between the terminal apparatuses retransmitting the uplink data. The physical retransmission request instruction channel may include the transmission power/spreading code/interleave pattern/Demodulation Reference Signal.

This enables, in the grant-free multiple access, the uplink data (initial transmission), which was multiplexed (collided) with the same time resource and with the same frequency resource, to be prevented from being multiplexed (collided) in the retransmission. Note that, in a case that the base station apparatus transmits the ACK in the physical retransmission request instruction channel, the base station apparatus may include information indicating retransmission timing in the physical retransmission request instruction channel. This enables the retransmission timing to be updated for the next uplink data (initial transmission) to be transmitted by the terminal apparatus.

Figure 7:
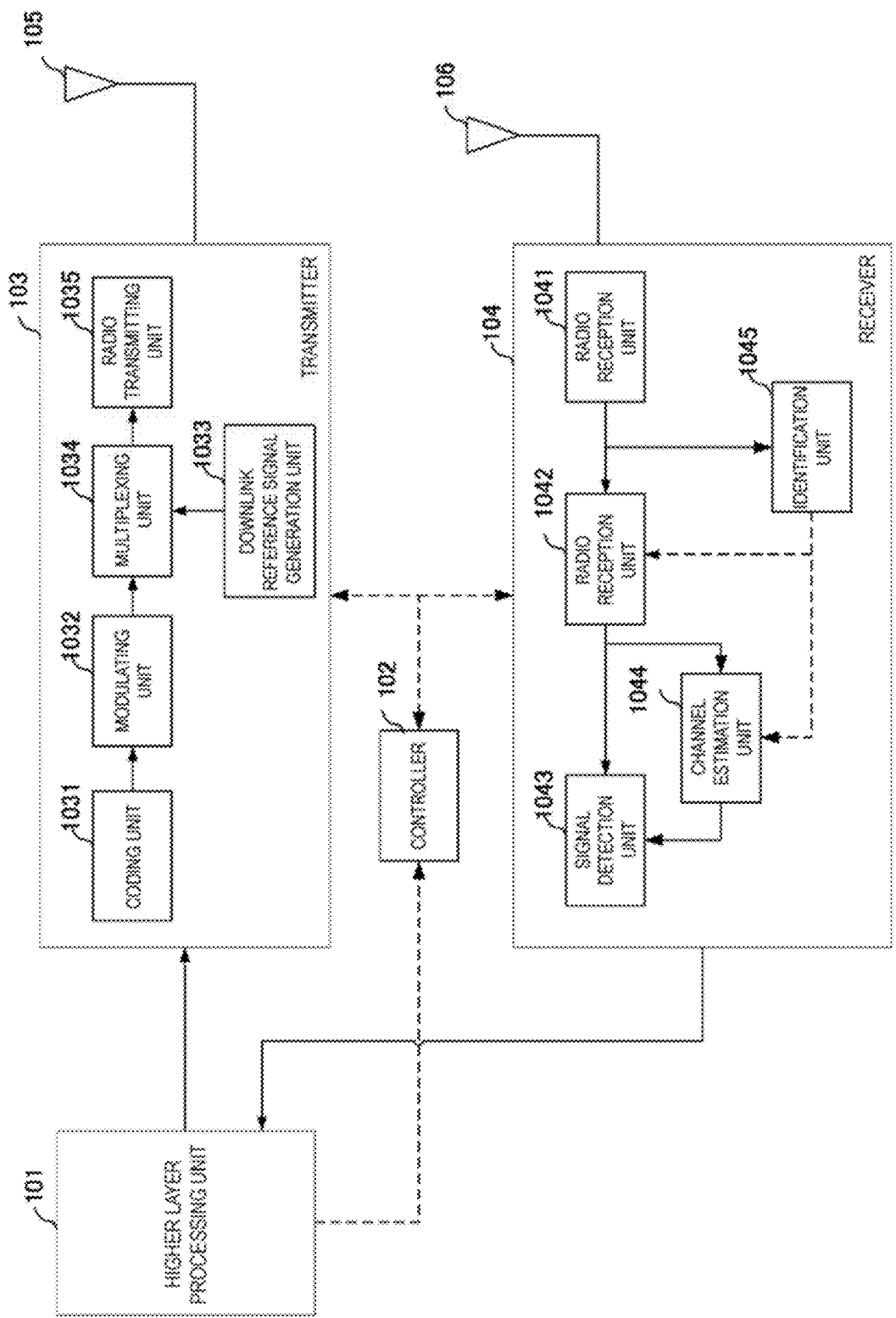
FIG. 7 is a schematic block diagram illustrating a configuration of a base station apparatus 10 according to the first embodiment.

FIG. 7 is a schematic block diagram illustrating a configuration of the base station apparatus 10 according to the present embodiment. The base station apparatus 10 includes a higher layer processing unit (higher layer processing step) 101, a controller (controlling step) 102, a transmitter (transmitting step) 103, a receiver (receiving step) 104, and a transmit antenna 105, and a receive antenna 106. The transmitter 103 generates a transmission signal (physical downlink channel) to the terminal apparatus 20 according to the logical channel input from the higher layer processing unit 101. The transmitter 103 includes a coding unit (coding step) 1031, a modulating unit (modulating step) 1032, a downlink reference signal generation unit (downlink reference signal generating step) 1033, a multiplexing unit (multiplexing step) 1034, and a radio transmitting unit (radio transmitting step) 1035. The receiver 104 detects the physical uplink channel and inputs the content to the higher layer processing unit 101. The receiver 104 includes a radio receiving unit (radio receiving step) 1041, a demultiplexing unit (demultiplexing step) 1042, a signal detection unit (signal detection step) 1043, a channel estimator (channel estimation step) 1044, and an identification unit (identification step) 1045.

The higher layer processing unit 101 performs processing of the layers higher than the physical layers such as Medium Access Control (MAC) layer, the Packet Data Convergence Protocol (PDCP) layer, the Radio Link Control (RLC) layer, and the Radio Resource Control (RRC) layer. The higher layer processing unit 101 generates information necessary to control the transmitter 103 and the receiver 104 and outputs the generated information to the controller 102. The higher layer processing unit 101 outputs the uplink data (for example, DL-SCH), broadcast information (for example, BCH), Hybrid Automatic Request (HARQ) indicator, and the like to the transmitter 103.

The higher layer processing unit 101 receives (via the receiver 104) information on a terminal apparatus, such as UE capability, from the terminal apparatus 20. The terminal apparatus transmits its function to the base station apparatus by higher layer signaling. The information on a terminal apparatus includes information indicating whether the terminal apparatus supports a prescribed function, or information indicating that the terminal apparatus has completed the introduction and testing of the prescribed function. Whether a prescribed function is supported includes whether the introduction and testing of the prescribed function has been completed.

For example, in a case where a terminal apparatus supports a prescribed function, the terminal apparatus transmits information (parameters) indicating whether the prescribed function is supported. In a case that a terminal apparatus does not support a prescribed function, the terminal apparatus may be configured not to transmit the information (a parameter) indicating whether the prescribed function is supported. In other words, whether the prescribed function is supported is reported by whether the information (parameters) indicating whether the prescribed function is supported is transmitted. The information (parameters) indicating whether a prescribed function is supported may be reported using one bit of 1 or 0.

The information on the terminal apparatus includes information indicating that the grant-free transmission (grant-free communication) is supported. In a case that there are multiple functions to support the grant-free transmission, the terminal apparatus may transmit information indicating whether each of the functions is supported for each function. The functions to support the grant-free transmission are part or all of: capability to support multiple tables indicating antenna ports, scrambling identities and the number of layers, capability to support the prescribed number of antenna ports, and capability to support a prescribed transmission mode. The transmission mode is determined by the number of antenna ports, transmission diversity, the number of layers, whether the grant-free transmission is supported, and the like. The capability to support the prescribed transmission mode may include, for example, capability to support the grant-free transmission in the FDD format and capability to support the grant-free transmission in the TDD format. For example, in a case that there are a plurality of FDD/TDD formats, the terminal apparatus may also transmit information indicating which FDD/TDD formats are supported as information on the terminal apparatus.

The higher layer processing unit 101 obtains, from the receiver 104, the signal detection result (including the decoded uplink data, which includes the CRC) of the physical uplink shared channel transmitted by each terminal apparatus. The higher layer processing unit 101 performs error detection of the UE ID and the uplink data in response to the signal detection. For example, the error detection is performed in the MAC layer.

The higher layer processing unit 101 generates an HARQ indicator (bit sequence indicating an ACK/NACK) on the basis of the error detection result. The HARQ indicator for the uplink data is output for each terminal apparatus and at each subframe. The higher layer processing unit 101 outputs the HARQ indicator to the transmitter 103. For example, one bit of "1" is output in the case of ACK, and one bit of "0" is output in the case of NACK. The HARQ indicator is used to generate the physical retransmission request instruction channel.

The higher layer processing unit 101 generates, or obtains from a higher node, system control information to be broadcast. The higher layer processing unit 101 outputs the system control information to be broadcast to the transmitter 103. The system control information to be broadcast may include information indicating that the base station apparatus supports the grant-free transmission. The system control information to be broadcast is arranged in the physical broadcast channel/physical downlink shared channel in the transmitter 103.

The higher layer processing unit 101 generates, or obtains from a higher node, the downlink data (transport block), System Information Block, the RRC message, the MAC CE, and the like, to be arranged in the physical downlink shared channel, and output them to the transmitter 103. The higher layer processing unit 101 may include parameters indicating setup and release of the grant-free transmission in these higher layer signaling.

The higher layer processing unit 101 manages various pieces of configuration information on the terminal apparatus 20. The various pieces of configuration information may include the parameters indicating setup and release of the grant-free transmission.

The higher layer processing unit 101 may also determine assignment of the identifying signal to each of the terminal apparatuses supporting the grant-free transmission. The higher layer processing unit 101 can include information on the identifying signal assignment to each of the terminal apparatuses in the RRC message. The information on the identifying signal assignment can include the parameters necessary for generating a sequence of identifying signals (phase rotation, cyclic delay, interleaving, OCC, or the like multiplied to the identifying signal). The higher layer processing unit 101 outputs the information on the identifying signal assignment to the controller 102/the transmitter 103. Note that some of the radio resource control functions may be performed in the MAC layer or the physical layer.

The higher layer processing unit 101 configures a Cell Radio Network Temporary Identifier (C-RNTI) for each terminal apparatus. The Cell Radio Network Temporary Identifier may include a grant-free transmission specific identifier. The identifier is used for encrypting (scrambling) the downlink control channel, the downlink data channel, and the physical retransmission request instruction channel. The identifier may also be used for a sequence that multiplies the physical retransmission request instruction channel. The identifier can be used for encrypting (scrambling) the identifying signal, the uplink data channel, and the uplink control channel. The higher layer processing unit 101 outputs the configuration information on the identifier to the controller 102/the transmitter 103/the receiver 104.

The higher layer processing unit 101 determines the coding rate of the physical channels (physical downlink shared channel, physical uplink shared channel), the modulation scheme (or MCS) and the transmission power (such as the power ratio of the identifying signal to the physical uplink shared channel, the power ratio of the reference signal to the identifying signal), and the like. The higher layer processing unit 101 outputs the coding rate/the modulation scheme/the transmission power ratio to the controller 102/the transmitter 103/the receiver 104. The higher layer processing unit 101 can include the coding rate/the modulation scheme/the transmission power ratio in the higher layer signaling.

On the basis of the various pieces of configuration information input from the higher layer processing unit 101, the controller 102 generates a control signal for controlling the transmitter 103 and the receiver 104. The controller 102 generates the Downlink Control Information on the basis of the information input from the higher layer processing unit 101 and outputs the generated DCI to the transmitter 103. The controller 102 can include the information on the retransmission of the uplink data in the Downlink Control Information.

Cyclic Redundancy Check (CRC) is attached to the control data sequence of the generated DCI format. Encryption (scrambling) with an identifier (for example, a Cell-Radio Network Temporary Identifier (C-RNTI)) is performed on the CRC. As the identifier, an identifier unique to the grant-free transmission can be used. The encrypted CRC is added to the DCI format. Signals generated as DCI format are arranged in the physical downlink control channel. Note that the functions of the controller 102 can be included in the higher layer processing unit 101.

The transmitter 103 generates a Downlink Reference Signal according to the control signal input from the controller 102. The transmitter 103, for each terminal apparatus, encodes and modulates the broadcast information, the Downlink Control Information, the downlink data, the HARQ indicator, and the like input from the higher layer processing unit 101 and generates the physical broadcast channel, the physical retransmission request instruction channel, the physical downlink control channel, and the physical downlink shared channel. The transmitter 103 multiplexes the physical broadcast channel, the physical retransmission request instruction channel, the physical downlink control channel, and the physical downlink shared channel, and the Downlink Reference Signal, and transmits them to the terminal apparatus via the transmission antenna 105.

The coding unit 1031 performs encoding (including repetition) such as block coding, convolutional coding, and turbo coding on the broadcast information, the Downlink Control Information, the downlink data, and the HARQ indicator input from the higher layer processing unit 101, using the predetermined coding scheme/the coding scheme determined by the higher layer processing unit 101. The modulating unit 1032 modulates the coded bits input from the coding unit 1031, in compliance with the predetermined modulation scheme/the modulation scheme determined by the higher layer processing unit 101 such as Binary Phase Shift Keying (BPSK), quadrature Phase Shift Keying (QPSK), 16 quadrature amplitude modulation (16QAM), 64QAM, or 256QAM.

The downlink reference signal generation unit 1033 generates, as the Downlink Reference Signal, a sequence that is already known to the terminal apparatus. The known sequence is obtained by a predetermined rule based on a physical cell identifier or the like for identifying the base station apparatus 10.

The multiplexing unit 1034 multiplexes the modulated modulation symbol of each channel, the generated Downlink Reference Signal, and the Downlink Control Information. To be more specific, the multiplexing unit 1034 maps the modulated modulation symbol of each channel, the generated Downlink Reference Signal, and the Downlink Control Information to a resource element. The resource element refers to as the smallest unit in which a signal constituted by one subcarrier and one OFDM symbol (or an SC-FDMA symbol) is arranged. The multiplexing unit 1034 maps the physical retransmission request instruction channel in the output signal from the modulating unit 1032 to a resource on the basis of the configured frequency resource and time resource (transmission timing of the ACK/NACK). Note that the information on the HARQ indicator/retransmission of the uplink data including the HARQ indicator may be one of the Downlink Control Information. In this case, a unique DCI format for notifying information on the HARQ indicator/retransmission of the uplink data including the HARQ indicator can be defined.

The radio transmitting unit 1035 generates an OFDM symbol by performing Inverse Fast Fourier Transform (IFFT) on the multiplexed modulation symbol and the like. The radio transmitting unit 1035 generates a baseband digital signal by adding a cyclic prefix (CP) to the OFDM symbol. Further, the radio transmission unit 1035 converts the digital signal into an analog signal, removes an extra frequency component by filtering, performs up-conversion to carrier frequency, amplifies the power, and outputs the resultant signal to the transmit antenna 105 for transmission.

Here, an example of generating the physical retransmission request instruction channel for the uplink data that has been grant-free transmitted will be described.

First, the higher layer processing unit 101 inputs the HARQ indicator an (delivery acknowledgement, ACK/NACK) to the transmitter 103 (for example, an is 0 in the case of NACK, and $a_n$ is 1 in the case of ACK). n is determined according to the unit at which the HARQ indicator is transmitted. In a case that the ACK/NACK is transmitted for each terminal apparatus, n corresponds to the ACK/NACK for the uplink data of the terminal apparatus 20-$n$. In a case that the ACK/NACKs are transmitted in a batch at each subframe, n corresponds to the ACK/NACK for the uplink data transmitted at a subframe n.

An example will be described of generating the physical retransmission request instruction channel such that data is multiplied by a spreading code sequence and a plurality of ACK/NACKs are transmitted. The coding unit 1031 may perform repetition on the HARQ indicator. For example, in a case that the repetition is performed three times, The NACK "0" and the ACK "1" are repeated as "000" and "111", respectively. The modulating unit 1032 performs data modulation (for example, BPSK modulation) on the output data of the coding unit 1031. Further, the modulating unit 1032 multiplies the data after the data modulation by a prescribed sequence (spreading sequence) (the data after the data modulation is spread by the prescribed sequence). An orthogonal sequence (or a quasi-orthogonal sequence) can be used as the sequence. The sequence can be associated with an identifier common to the UE IDs/terminal apparatuses. For example, the identifier common to the UE IDs/terminal apparatuses is configured to be a generation parameter having the orthogonal sequence. For example, the orthogonal sequence is cyclically shifted on the basis of the identifier common to the UE IDs/terminal apparatuses. Further, the multiplexing unit 1034 maps the output signal from the modulating unit 1032 to the resource with which the physical retransmission request instruction channel is transmitted, based on the configured frequency resource and time resource (transmission timing of an ACK/NACK). The multiplexing unit 1034 can code-multiplex a plurality of physical retransmission request instruction channels in the same frequency resource and time resource.

In another aspect, a case will be described in which the CRC is added, and the physical retransmission request instruction channel is generated. The higher layer processing unit 101 adds the CRC parity bits to the bit sequence of the information related to the uplink data retransmission including the HARQ indicator. The higher layer processing unit 101 may add the CRC parity bits to information related to the uplink data retransmission including a plurality of HARQ indicators. The bit sequence after the addition of the CRC is indicated as "$x_0, x_1, \ldots, x_{q-1}, p_0, p_1, \ldots p_{r-1}$" (x is a bit sequence of the HARQ indicator, p is a CRC parity bit sequence, q is the total number of ACK/NACK bits, and r is the number of CRC parity bits).

The base station apparatus can configure the bit sequence length of the HARQ indicator x (or the number of fields to store ACK/NACKs) according to the uplink system bandwidth or the like. The base station apparatus can notify the terminal apparatus of the storage field index of the ACK/NACK for each uplink data by using the RRC message/downlink control channel or the like. The base station apparatus stores the ACK/NACK for each uplink data according to the storage field index notified to each terminal apparatus in advance.

In one aspect, the base station apparatus adds the CRC parity bits to a plurality of ACK/NACKs having the same transmission timing. In FIG. 6, the CRC parity bits are added to the bit sequence of the information on the ACK/NACK bits (1 bit each) of the ACK/NACK #0-1 to the ACK/NACK #0-6 transmitted at the subframe #4 and on the uplink data retransmission for the ACK/NACK #0-1 to the ACK/NACK #0-6. The higher layer processing unit 101 scrambles (masks) the CRC parity bits $p_0, p_1, \ldots P_{r-1}$ using the identifier common to the terminal apparatuses. For example, in FIG. 6, in a case that the CRC parity bit length is 16 bits, and the sequence associated with the identifier common to the terminal apparatuses is 1 plus the number of the subframe at which the ACK/NACK is transmitted, the CRC parity bits of the ACK/NACK to be transmitted at the subframe #4 is scrambled with the sequence of "0000000000000101".

In another aspect, the base station apparatus adds the CRC parity bits to the ACK/NACK for a plurality of uplink data associated with the same identifying signal sequence. The higher layer processing unit 101 scrambles the CRC parity bits $p_0, p_1, \ldots p_{r-1}$ by using the identifying signal sequence or the sequence generated from the parameter indicating the identifying signal.

The coding unit 1031 performs error correction coding (including rate matching) on bit sequences of a plurality of ACK/NACKs to which the CRC parity bits are added. The modulating unit 1032 performs data modulation on the output signal from the coding unit 1031.

The base station apparatus may add the CRC parity bits to each ACK/NACK for the uplink data. In FIG. 6, the CRC parity bits are added to each of the ACK/NACK #0-1 to the ACK/NACK #0-6 transmitted at the subframe #4. The higher layer processing unit 101 scrambles (masks) the CRC parity bits using an identifier (UE ID) unique to the terminal apparatus. The coding unit 1031 performs error correction coding (including rate matching) on each ACK/NACK bit sequence to which the CRC parity bits are added. The modulating unit 1032 performs data modulation on the output signal from the coding unit 1031.

As described above, the ACK/NACK for the uplink data in the grant-free transmission is generated associated with an identifier common to terminal apparatuses/an identifier unique to a terminal apparatus/an identifying signal sequence. Therefore, it is possible to efficiently transmit an ACK/NACK in the grant-free multiple access.

In accordance with the control signal input from the controller 102, the receiver 104 detects (demultiplexes, demodulates, decodes) the reception signal from the terminal apparatus 20 via the receive antenna 106 and outputs the decoded information to the higher layer processing unit 101. The controller 102 obtains the identification result of the terminal apparatus (such as the identifier applied to the identified terminal apparatus) from the identification unit 1045 and outputs the obtained identification result to the higher layer processing unit 101. The controller 102 obtains information on uplink data retransmission to the identified terminal apparatus. The controller 102 controls the transmitter 103 on the basis of the information on the uplink data retransmission.

The radio reception unit 1041 converts, by down-converting, an uplink signal received through the receive antenna 106 into a baseband signal, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1041 removes a portion corresponding to the CP from the converted digital signal. The radio reception unit 1041 performs Fast Fourier Transform (FFT) on the signal from which the CP has been removed, and extracts a signal in the frequency domain. The signal in the frequency domain is output to the demultiplexing unit 1042. Further, the radio reception unit 1041 outputs the signal from which the CP has been removed to the identification unit 1045.

The identification unit 1045 extracts the identifying signal from the received signal. Using the identifying signal, the identification unit 1045 identifies (specifies) the terminal apparatus that has transmitted the uplink data in the grant-free transmission. For example, the identification unit 1045 identifies a transmission terminal apparatus by blind detection using correlation processing between an identifying signal sequence held by the base station apparatus 10 and the extracted identifying signal sequence. The identification unit 1045 outputs the information on the transmission terminal apparatus to the channel estimator 1044 and the demultiplexing unit 1042. The identification unit 1045 outputs the information on the transmission terminal apparatus to the higher layer processing unit 101 (via the controller 102).

The demultiplexing unit 1042 demultiplexes the signal input from the radio reception unit 1041 into a signal of an uplink data channel, a signal of an uplink control channel, and the like. The demultiplexing unit 1042 uses the information on the transmission terminal apparatus identified by the identification unit 1045 (uplink data channel assignment information or the like associated with the identifying signal) to demultiplex the frequency domain signal into the uplink data channel, the uplink control channel, and the reference signal. The demultiplexed reference signal is input to the channel estimator 1044. The demultiplexed uplink data channel and uplink control channel are output to the signal detection unit 1043.

In the channel estimator 1044, the reference signal (for example, DMRS) that is time-multiplexed with the data signal and is transmitted and information on the identified transmission terminal apparatus are input. The channel estimator 1044 estimates the frequency response using the reference signal and outputs the frequency response estimated for demodulation to the signal detection unit 1043. Note that the channel estimator 1044 can also use the identifying signal for channel estimation.

Figure 8:
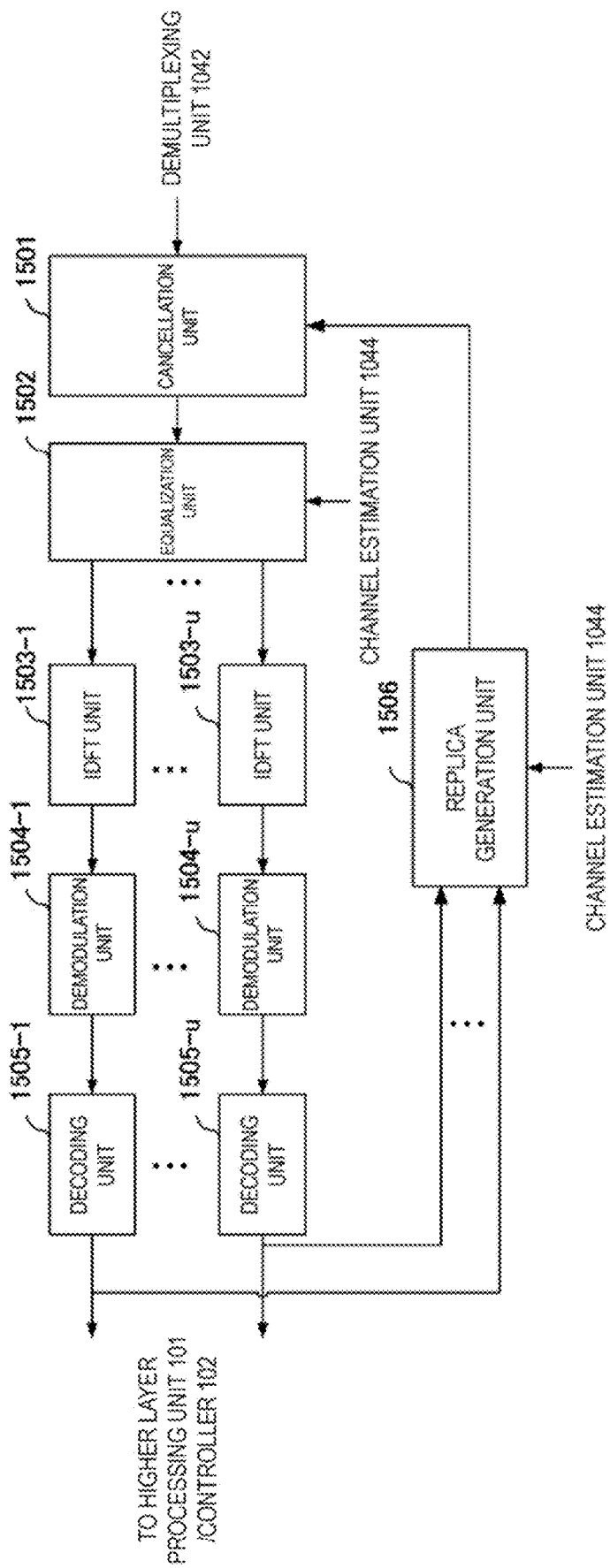
FIG. 8 is a diagram illustrating an example of a signal detection unit according to the first embodiment.

FIG. 8 is a diagram illustrating an example of a signal detection unit according to the present embodiment. The signal detection unit 1043 includes a cancellation unit 1501, an equalization unit 1502, IDFT units 1503-1 to 1503-$u$, demodulation units 1504-1 to 1504-$u$, decoding units 1505-1 to 1505-$u$, and a replica generation unit 1506 ($1<u<U$, U is the number of terminal apparatuses identified by the identification unit 1045 and non-orthogonally multiplexed/orthogonally multiplexed at the same time and at the same frequency). In the signal detection unit 1043, the reception signal of each terminal apparatus extracted by the demultiplexing unit 1042 is input to the cancellation unit 1501. The cancellation unit 1501 performs cancellation processing on each reception signal using the soft replica input from the replica generation unit 1506. The equalization unit 1502 generates an equalization weight based on the MMSE criterion from the frequency response input from the channel estimator 1044. Note that the equalization unit 1502 can also use the frequency response calculated from the identifying signal in the equalization weight generation.

The equalization unit 1502 multiplies the soft-canceled signal (input signal from the cancellation unit 1501) by the equalization weight. The equalization unit 1502 outputs the equalized signals for each terminal apparatus to the IDFT units 1503-1 to 1503-$u$. The IDFT units 1503-1 to 1503-$u$ convert received signals after equalization in the frequency domain into time domain signals. Note that, in a case that the terminal apparatus applies cyclic delay, phase rotation, and interleaving to the signal before or after the DFT in the transmission processing, the received signal or the time domain signal after the frequency domain equalization is subjected to processing to undo the cyclic delay, the phase rotation, and the interleaving. Although not illustrated, in the demodulation units 1504-1 to 1504-$u$, information on a pre-notified or pre-determined modulation scheme is input. The demodulation units 1504-1 to 1504-$u$ demodulate the time domain signal on the basis of the information on the modulation scheme and output a bit sequence Log Likelihood Ratio (LLR).

Although not illustrated, information on a pre-notified or pre-determined coding rate is input in the decoding units 1505-1 to 1505-$u$. The decoding units 1505-1 to 1505-$u$ perform decoding processing on the LLR sequence output from the demodulation unit. The decoding units 1505-1 to 1505-$u$ output the external LLR or the posterior LLR to be output from the decoding unit to the replica generation unit 1506, for the cancellation processing such as Successive Interference Canceller (SIC) and turbo equalization. The difference between the external LLR and the posterior LLR is whether to subtract the prior LLR that has been input to the decoding units 1505-1 to 1505-*u* from the decoded LLR. Note that, in a case that the terminal apparatus applies puncturing (thinning), interleaving, or scrambling to the encoded bit string after the error correction coding in the transmission processing, the signal detection unit 1043 applies de-puncturing (0 is inserted into the LLR with thinned-out bits), de-interleaving (rearranged bits are returned to the original position) and de-scramble to the LLR sequence to be input to the decoding units 1505-1 to 1505-*u*.

The replica generation unit 1506 receives the LLR sequence from each decoding unit and generates a symbol replica in accordance with the modulation scheme that each terminal apparatus applied to the uplink data. In addition, the replica generation unit 1506 converts the symbol replica into a signal in the frequency domain by DFT, assigns the signal to the resource used by each terminal apparatus, and generates the soft replica by multiplying the resultant by the frequency response input from the channel estimation unit 1044. In a case that the number of repetitions of SIC or turbo equalization reaches a prescribed number of times, the decoding units 1505-1 to 1505-*u* perform hard decision on the decoded LLR sequence and inputs the hard decision result to the higher layer processing unit 101. Note that, in FIG. 8, signal detection using turbo equalization processing has been described, but maximum likelihood detection, EMMSE-IRC, SLIC, CWIC, or the like can also be used.

The higher layer processing unit 101 determines whether there is an error in the UE ID by using the first CRC included in the hard decision result. The higher layer processing unit 101 determines whether there is an error in the uplink data by using the second CRC included in the hard decision result.

Figure 9:
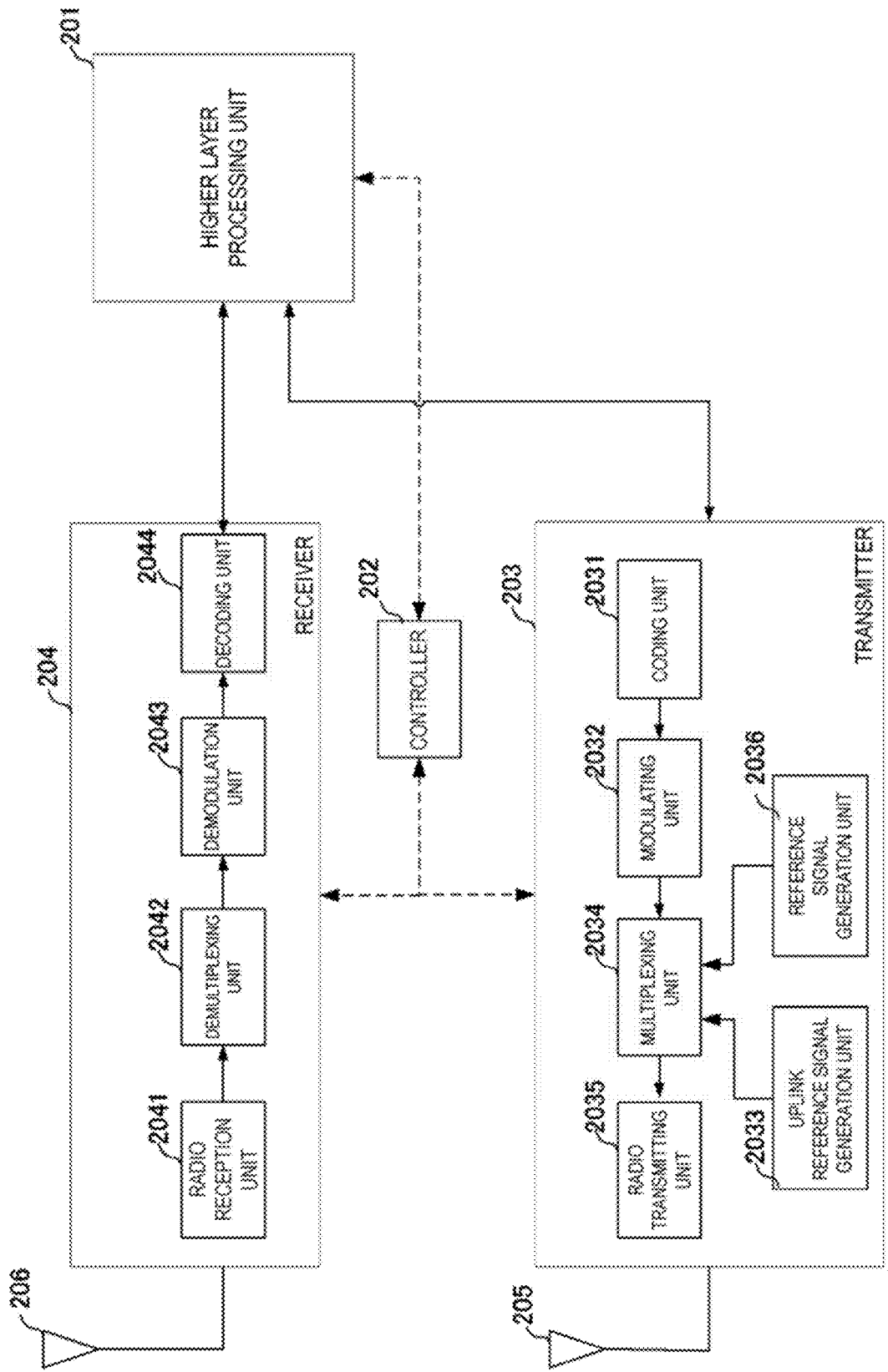
FIG. 9 is a schematic block diagram illustrating a configuration of a terminal apparatus 20 according to the first embodiment.

FIG. 9 is a schematic block diagram illustrating a configuration of the terminal apparatus 20 according to the present embodiment. The terminal apparatus 20 includes a higher layer processing unit (higher layer processing step) 201, a controller (controlling step) 202, a transmitter (transmitting step) 203, a receiver (receiving step) 204, a transmit antenna 205 and a receive antenna 206. The transmitter 203 includes a coding unit (coding step) 2031, a modulating unit (modulating step) 2032, an uplink reference signal generation unit (uplink reference signal generating step) 2033, a multiplexing unit (multiplexing step) 2034, a radio transmitting unit (radio transmitting step) 2035, and an identifying signal generation unit 2036. The receiver 204 includes a radio reception unit (radio receiving step) 2041, a demultiplexing unit (demultiplexing step) 2042, a demodulation unit (demodulating step) 2043, and a decoding unit (decoding step) 2044.

The higher layer processing unit 201 performs processing of a Medium Access Control (MAC) layer, a Packet Data Convergence Protocol (PDCP) layer, a Radio Link Control (RLC) layer, and a Radio Resource Control (RRC) layer. The higher layer processing unit 201 outputs, to the transmitter 203, information indicating the function of the terminal apparatus supported by the terminal apparatus itself (UE Capability). For example, the information indicating the function of the terminal apparatus supported by the terminal apparatus itself includes information indicating that the terminal apparatus supports the grant-free transmission. In a case that the terminal apparatus has a plurality of functions supporting the grant-free transmission, the higher layer processing unit 201 may transmit information indicating whether each of the functions is supported. For example, the higher layer processing unit 201 transmits information indicating the functions of the terminal apparatus supported by the terminal apparatus itself through the RRC layer signaling.

The higher layer processing unit 101 interprets the Downlink Control Information (DCI) received via the receiver 204. The higher layer processing unit 101 can interpret the information on the grant-free transmission included in the Downlink Control Information. The higher layer processing unit 101 generates control information for controlling the receiver 204 and the transmitter 203 and outputs the generated control information to the controller 202.

The higher layer processing unit 201 manages various pieces of configuration information on the terminal apparatuses itself. A part of the various pieces of configuration information is input to the controller 202. A part of various pieces of configuration information is received from the base station apparatus 10 via the receiver 204. The various pieces of configuration information includes information indicating an uplink radio frame format. The various pieces of configuration information includes configuration information on the grant-free transmission received from the base station apparatus 10. The information on the grant-free transmission includes information on assignment of identifying signals to each terminal apparatus, configuration of the grant-free transmission specific identifier, setup for the grant-free transmission, parameter indicating release, ACK/NACK reception timing for uplink data signal, retransmission timing of the uplink data signal, information indicating change of these pieces of configuration information on the grant-free transmission, and a signal indicating the identifying signal. The higher layer processing unit 201 manages radio resources for transmitting the uplink data (transport block) in the grant-free transmission on the basis of information on the grant-free transmission.

The higher layer processing unit 201 outputs the uplink data generated by a user operation or the like, to the transmitter 203. The higher layer processing unit 201 can also output the uplink data generated without a user operation (for example, data obtained by a sensor) to the transmitter 203. The higher layer processing unit 201 adds CRC parity bits (second CRC) to the uplink data. The CRC parity bits are generated from the uplink data. The CRC parity bits are scrambled (also referred to as EXCLUSIVE-OR operated or masked) by a prescribed UE ID (a block performing scramble processing is also referred to as a scramble processing unit, an EXCLUSIVE-OR operation unit or a masking unit). As the UE ID, a cell radio network temporary identifier may be used. As the radio network temporary identifier, an identifier unique to the terminal apparatus that performs the grant-free transmission may be used. The higher layer processing unit 201 adds CRC parity bits (first CRC) to the UE ID. The CRC parity bits are generated from the uplink data. The first CRC parity bits are scrambled (also referred to as EXCLUSIVE-OR operated or masked) with a sequence generated using the identifying signal sequence or a parameter associated with the identifying signal sequence.

The higher layer processing unit 201 obtains an ACK/NACK (HARQ indicator) for the uplink data included in the physical retransmission request instruction channel via the receiver 204. At this time, the higher layer processing unit 201 performs descrambling processing (EXCLUSIVE-OROR operation or masking) using an identifier masking the CRC added to the HARQ indicator (a block performing descramble is also referred to as a descramble processing unit, an EXCLUSIVE-OR operation unit or a masking unit). The higher layer processing unit 201 can identify the ACK/NACK addressed to the terminal apparatus itself included in the physical retransmission request instruction channel, by using the subframe number or the like of the subframe at which the uplink data/identifying signal is transmitted, when obtaining the ACK/NACK for the uplink data. The higher layer processing unit 201 can also identify the ACK/NACK addressed to the terminal apparatus itself, based on the ACK/NACK storage field index notified from the base station apparatus.

In the case of NACK, the higher layer processing unit 201 inputs control information for retransmitting the uplink data to the controller 202. The control information for the retransmission includes the information indicating the retransmission timing, the information indicating the frequency resources for the retransmission, the information indicating an identifying signal for the retransmission, and the information on the Redundancy Version (RV) of the physical uplink shared channel. The controller 202 controls the transmitter 203 on the basis of the control information for retransmission.

The controller 202 generates the control signal for controlling the transmitter 203 and the receiver 204 on the basis of the various pieces of configuration information input from the higher layer processing unit 201. The controller 202 generates the Uplink Control Information (UCI) on the basis of the information input from the higher layer processing unit 201, and outputs the generated information to the transmitter 203. The controller 202 can generate the Cyclic Redundancy Check (CRC) for the data sequence of the UCI format. The CRC may be encrypted (scrambled) by the Cell-Radio Network Temporary Identifier (C-RNTI). An identifier unique to the terminal apparatus for the grant-free transmission can be used for the C-RNTI. The encrypted CRC is added to the UCI format.

The receiver 204 demultiplexes, demodulates, and decodes a reception signal received from the base station apparatus 10 via the receive antenna 206. The receiver 204 outputs the decoded information to the higher layer processing unit 201. The radio reception unit 2041 converts, by down-converting, a downlink signal received via the receive antenna 206 into a baseband signal, removes unnecessary frequency components, controls the amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 2041 removes a portion corresponding to the CP from the converted digital signal, performs Fast Fourier Transform on the signal from which the CP has been removed, and extracts a signal in the frequency domain.

The demultiplexing unit 2042 demultiplexes the extracted frequency domain signals into downlink channels (the physical retransmission request instruction channel, the physical downlink control channel, the physical downlink shared channel) and the Downlink Reference Signal. The demultiplexing unit 2042 compensates for the downlink channel on the basis of the channel estimation value obtained by measuring the channel using the Downlink Reference Signal. The demultiplexing unit outputs each downlink channel to the demodulation unit 2043.

The demodulation unit 2043 demodulates the received signal for each of the modulation symbols of each downlink channel, using a predetermined modulation scheme such as BPSK, QPSK, 16QAM, 64QAM, and 256QAM or a modulation scheme pre-notified in a downlink grant. In a case that the physical retransmission request instruction channel is spread by the identifier/identifying signal or the like, the demodulation unit 2043 performs despread processing using the identifier before demodulation processing.

The decoding unit 2044 decodes the demodulated encoded bits of each downlink channel in a predetermined coding scheme, at a predetermined coding rate or a coding rate previously notified in the downlink grant, and outputs the decoded downlink data, the Downlink Control Information, and the HARQ indicator to the higher layer processing unit 201.

The transmitter 203 generates an Uplink Reference Signal according to the control signal input from the controller 202. The transmitter 203 encodes and modulates the uplink data (transport block) and the uplink control signal input from the higher layer processing unit 201 to generate a physical uplink control channel and a physical uplink shared channel. The physical uplink control channel is encrypted (also referred to as scrambled, EXCLUSIVE-OR operated, or masked) using a prescribed identifier. The physical uplink control channel to be grant-free transmitted can be encrypted using the identifying signal.

The transmitter 203 multiplexes the physical uplink control channel, the physical uplink shared channel, and the Uplink Reference Signal and transmits them to the base station apparatus 10 via the transmission antenna 205.

The coding unit 2031 codes the Uplink Control Information and the uplink data input from the higher layer processing unit 201 in compliance with a coding scheme, such as convolutional coding, block coding, or turbo coding.

The modulating unit 2032 modulates coded bits input from the coding unit 2031, in compliance with the modulation scheme notified with the Downlink Control Information, such as BPSK, QPSK, 16QAM, or 64QAM, or in compliance with a modulation scheme prescribed in advance for each channel.

The uplink reference signal generation unit 2033 generates a sequence obtained according to a rule (formula) prescribed in advance, based on a physical cell identifier (also referred to as a physical cell identity (PCI), a cell ID, UE ID or the like) for identifying the base station apparatus 10, a bandwidth to which the Uplink Reference Signal is mapped, a cyclic shift, a parameter value for generation of a DMRS sequence, and the like. The uplink reference signal may be associated with the identifying signal. For example, the Uplink Reference Signal may be multiplied by an identifying signal. Also, the predetermined rule (formula) may include an identifying signal sequence generation parameter.

The identifying signal generation unit 2036 generates a sequence obtained according to a predetermined rule (formula) on the basis of the configuration information on the grant-free transmission. For example, an orthogonal sequence or quasi-orthogonal sequence (pseudo-orthogonal sequence) such as M sequence, Zadoff Chu sequence, Hadamard sequence or the like can be used as the identifying signal sequence. Furthermore, the identifying signal generation unit 2036 performs phase rotation/cyclic delay/OCC/interleaving on the identifying signal sequence on the basis of the configuration information on the grant-free transmission.

The multiplexing unit 2034 rearranges modulation symbols of uplink data channel in parallel, and then performs the Discrete Fourier Transform (DFT). The multiplexing unit 2034 multiplexes the uplink control channel, the uplink data channel, the identifying signal, and the Uplink Reference Signal for each transmit antenna port. Namely, the multiplexing unit 2034 arranges the uplink control channel, the uplink data channel, the identifying signal, and the Uplink Reference Signal in the resource element for each transmit antenna port.

The radio transmitting unit 2035 performs Inverse Fast Fourier Transform (IFFT) on the multiplexed signal, performs modulation in the SC-FDMA scheme, and generates SC-FDMA symbols. The radio transmitting unit 2035 adds the CP to the SC-FDMA symbol and generates a baseband digital signal. Further, the radio transmitting unit 2035 converts the baseband digital signal into an analog signal, removes extra frequency components, converts the frequency thereof into a carrier frequency by up-conversion, performs power amplification, and transmits the resultant to the base station apparatus 10 via the transmit antenna 205.

As described above, in the communication system using the grant-free multiple access according to the present embodiment, the uplink data is associated with the identifier unique to the identifying signal/terminal apparatus related to the grant-free transmission. The identifier (UE ID) of the terminal apparatus that transmits the uplink data is associated with the identifying signal. The ACK/NACK for each terminal apparatus or the ACK/NACKs in a batch are applied to the ACK/NACK for the uplink data. In the grant-free multiple access in which the base station apparatus cannot pre-schedule the resource with which the uplink data is transmitted, this enables the base station apparatus and the terminal apparatus to efficiently perform retransmission control.

Second Embodiment

The communication system according to the present embodiment is an alternative embodiment in which the base station apparatus transmits an ACK/NACK on the basis of the result of terminal identification. The communication system according to the present embodiment includes the base station apparatus 10 and the terminal apparatus 20 described in FIGS. 1 to 9. Differences/additional points from/to the first embodiment will be mainly described below.

Figure 10:
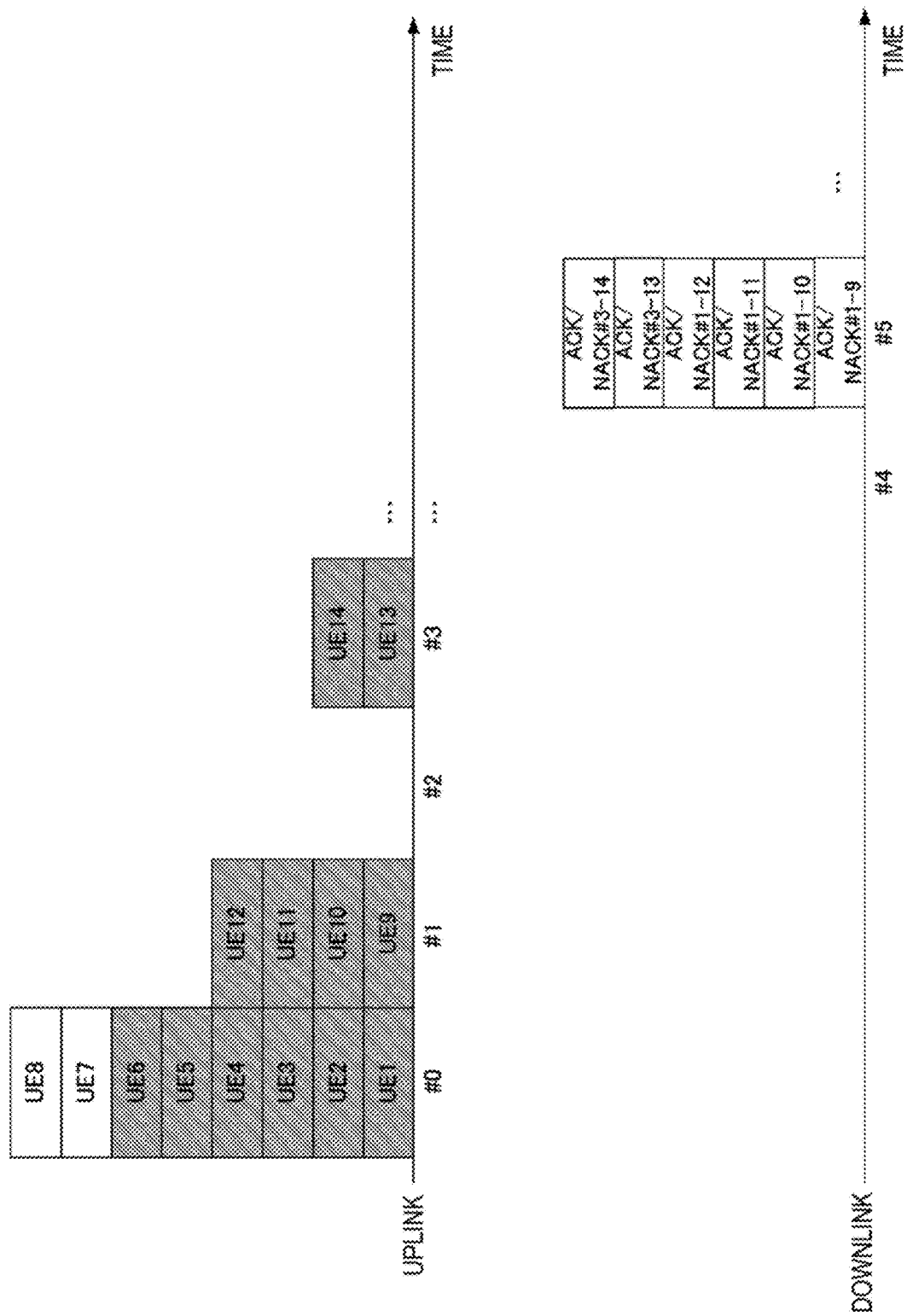
FIG. 10 is a diagram illustrating an example of ACK/NACK transmission for uplink data according to a second embodiment.

FIG. 10 is a diagram illustrating an example of ACK/NACK transmission for the uplink data according to the present embodiment. An ACK/NACK #m-n is an ACK/NACK for UE #n received at a subframe #m. FIG. 10 illustrates a case where an ACK/NACK is transmitted for each terminal apparatus. UE 1 to UE 14 in FIG. 10 correspond to the uplink data (including identifying signals) of the terminal apparatuses 20-1 to 20-14. A subframe is a time unit at which the terminal apparatus assigns the uplink data.

Let us assume that the base station apparatus detects the uplink data UE 1 to UE 14 transmitted by each terminal apparatus in the terminal identification processing using the identifying signal (S202 in FIG. 5). Furthermore, in the terminal identification processing using the first CRC, let us assume that the base station apparatus identifies the uplink data UE 1 to UE 6 and UE 9 to UE 14 (the area hatched diagonally right up in FIG. 10) out of the uplink data UE 1 to UE 14 (S203 in FIG. 5).

In the subframe #0, the base station apparatus determines from the result of the terminal identification processing using the first CRC that there is an error in part of the terminal identification (UE 7, UE 8) using the identifying signal. In this case, the base station apparatus does not transmit the ACK/NACK to all the terminal apparatuses (UE 1 to UE 8) at the subframe #0 detected using the identifying signal, and terminates the detection processing (at the subframe #4 in FIG. 10, the base station apparatus does not transmit an ACK/NACK). Namely, the terminal apparatus that has transmitted the uplink data (UE 1 to UE 8) does not receive an ACK/NACK. In this case, the terminal apparatus determines that the terminal identification by the base station apparatus was a failure after the ACK/NACK reception timing has passed (in a case that no ACK/NACK was received by the ACK/NACK reception timing) (regarded as a NACK due to the terminal identification failure).

At the subframes #1 and #3, the base station apparatus determines that all the terminal identification using the identifying signal is correct from the result of the terminal identification processing using the first CRC. In this case, the base station apparatus determines whether the base station apparatus correctly received the uplink data UE 9 to UE 14 (S206 of FIG. 5). In this case, the base station apparatus transmits an ACK or a NACK to the UE 9 to the UE 14 at the downlink subframe #5 on the basis of the detection result (the ACK/NACK #1-9 to the ACK/NACK #1-12, the ACK/NACK #3-13 to the ACK/NACK #3-14). Note that FIG. 6 illustrates a case where the transmission timing of the ACK/NACK #3 is configured to ½ of the transmission timing of the ACK/NACK #1.

As described above, in the communication system according to the present embodiment, in a case that there is an error in the identification of the terminal apparatus that has transmitted the multiplexed uplink data, the base station apparatus determines that there was an error in terminal identification for all of the terminal apparatuses. This enables, in the grant-free multiple access, efficient detection of the uplink data while preventing degradation of terminal identification accuracy.

Third Embodiment

The communication system according to the present embodiment is another alternative embodiment in which the base station apparatus transmits the ACK/NACK on the basis of the result of terminal identification. The communication system according to the present embodiment includes the base station apparatus 10 and the terminal apparatus 20 described in FIGS. 1 to 10. Differences/additional points from/to the first embodiment and the second embodiment will be mainly described below.

In the communication system according to the present embodiment, a plurality of types of negative acknowledgements (NACK) are used. The type of NACK is associated with that reason. The first NACK (first negative acknowledgement) is transmitted in a case that the base station apparatus detects an error in the uplink data. The second NACK (second negative acknowledgement) is transmitted in a case that the base station apparatus fails in terminal identification.

Figure 11:
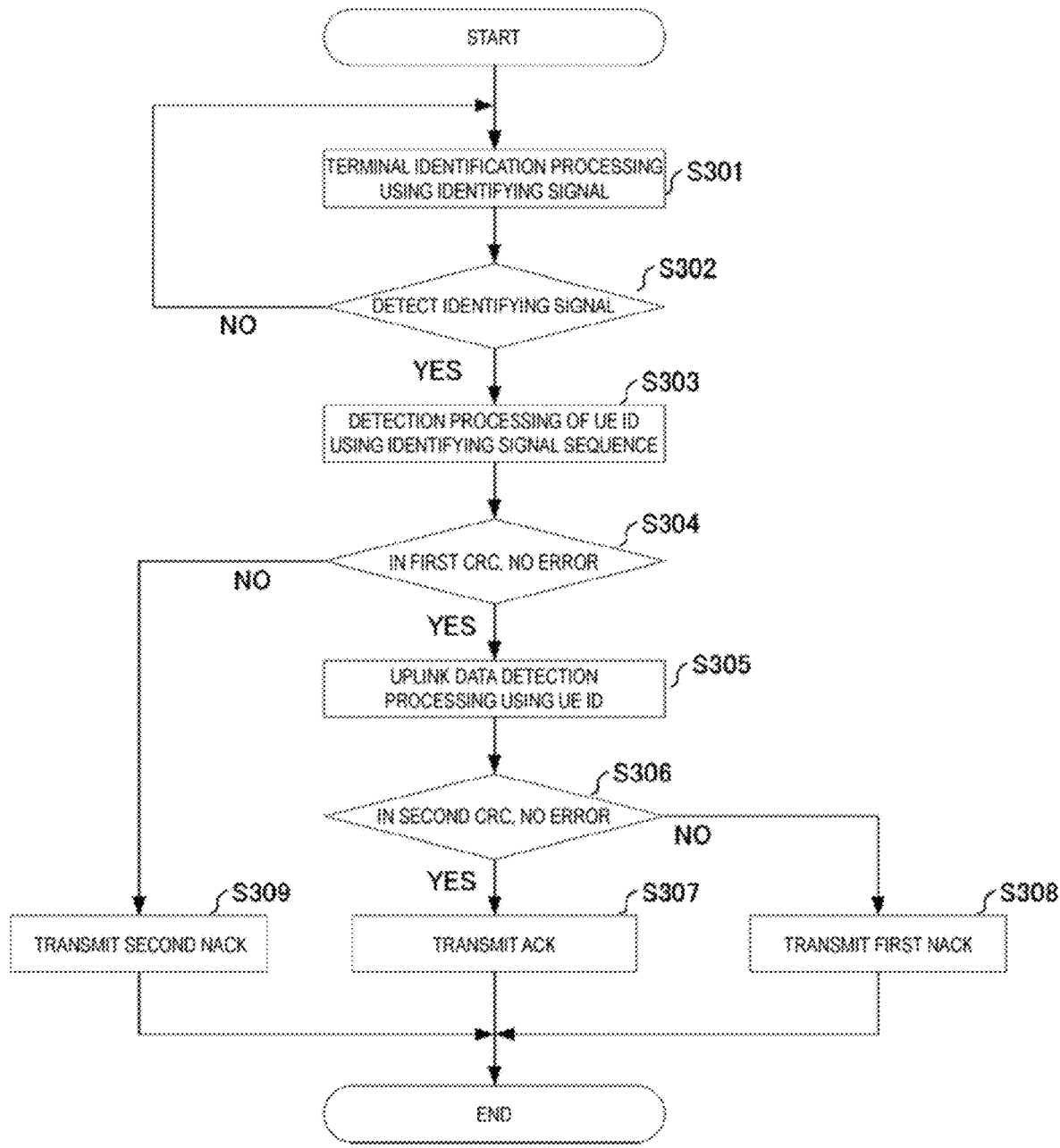
FIG. 11 is a diagram illustrating an example of a flow chart of an uplink data detection according to a third embodiment.

FIG. 11 is a diagram illustrating an example of a flow chart of an uplink data detection according to the present embodiment. Using the identifying signal, the base station apparatus identifies which terminal apparatus has transmitted the uplink data (S301, also referred to as coarse terminal identification processing). For example, the base station apparatus performs identification processing in each symbol by correlation processing using an identifying signal sequence. In a case that the base station apparatus determines that the terminal apparatus that transmitted the uplink data is present (reception (detection) of the identifying signal) (YES in S302), the base station apparatus performs uplink data detection processing of the terminal apparatus (S303 to S309). The base station apparatus performs signal detection such as turbo equalization on the uplink data channel by using the terminal identification processing and the result of channel estimation.

The base station apparatus performs descrambling processing (also referred to as EXCLUSIVE-OR operation or masking) on the first CRC using the received identifying signal sequence (also referred to as fine terminal identification processing in step S303). In a case that an error is detected in the first CRC (NO in S304), the base station apparatus determines that the terminal identification process based on the identifying signal failed. In this case, the base station apparatus transmits the second NACK on the basis of the detection result using the identifying signal (S309).

In a case that an error is not detected in the first CRC (YES in S304), the base station apparatus determines that the identification of the terminal apparatus to which the identifier stored in the UE ID part is assigned has succeeded. The base station apparatus can hold in advance the association list between the identifying signal and the UE ID. A step may be added in which the base station apparatus determines whether the identifier stored in the UE ID part is correct using the association list.

In the case of YES in S304, the base station apparatus performs the process of detecting the uplink data stored in the uplink data part by using the UE ID (S305). Specifically, the base station apparatus descrambles the second CRC using the UE ID. In a case that an error is detected in the second CRC (NO in S306), the base station apparatus determines that the uplink data could not be correctly received and transmits a first NACK to the terminal apparatus that transmitted the uplink data (S308). In a case that no error is detected in the second CRC (YES in S306), the base station apparatus determines that the uplink data has been correctly received and transmits an ACK to the terminal apparatus that transmitted the uplink data (S307). In S307/S308/S309, the base station apparatus may transmit the ACK/NACK for each terminal apparatus or may transmit the ACK/NACKs in a batch for the uplink data received in a prescribed time resource (for example, the same subframe).

Figure 12:
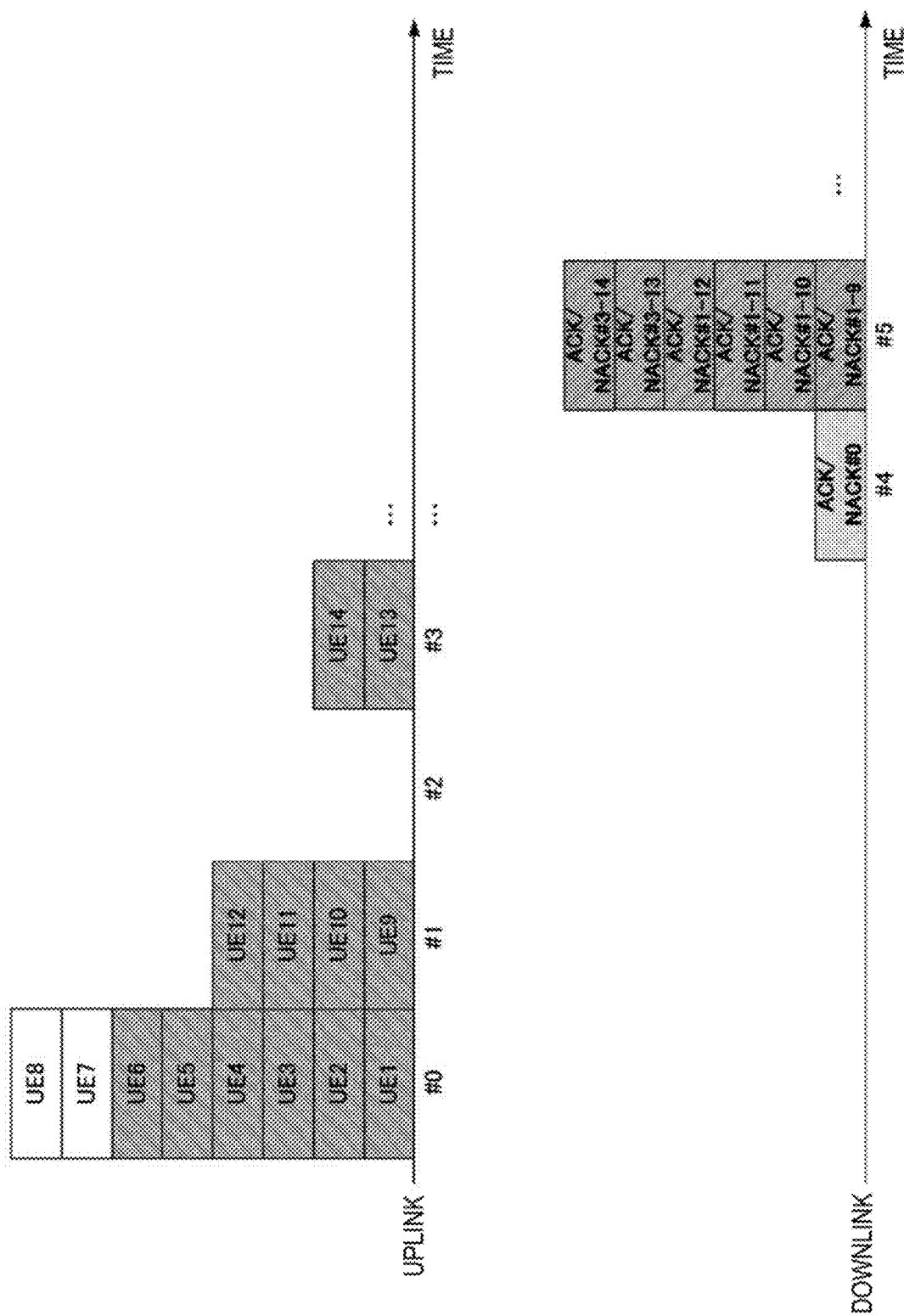
FIG. 12 is a diagram illustrating an example of ACK/NACK transmission for uplink data according to the third embodiment.

FIG. 12 is a diagram illustrating an example of ACK/NACK transmission for the uplink data according to the present embodiment. An ACK/NACK #m is a batched ACK/NACKs at a subframe #m. An ACK/NACK #m-n is an ACK/NACK for UE #n received at a subframe #m. FIG. 12 illustrates a case where the ACK/NACK is transmitted for each terminal apparatus. UE 1 to UE 14 in FIG. 12 correspond to the uplink data (including identifying signals) of the terminal apparatuses 20-1 to 20-14. A subframe is a time unit at which the terminal apparatus assigns the uplink data.

Let us assume that in the terminal identification processing using the identifying signal (S302 in FIG. 11), the base station apparatus detects the uplink data UE 1 to UE 14 transmitted by each terminal apparatus. Further, let us assume that in the terminal identification process using the first CRC, the base station apparatus identifies the uplink data UE 1 to UE 6 and the UE 9 to UE 14 (the area hatched diagonally right up in FIG. 12) out of the uplink data UE 1 to UE 14 (S303 in FIG. 11).

At the subframe #0, the base station apparatus determines that there is an error in part of the terminal identification (UE 7, UE 8) using the identifying signal from the result of the terminal identification processing using the first CRC (NO in S304). In this case, the base station apparatus transmits a second NACK with a prescribed transmission timing (ACK/NACK#0) to all the terminal apparatuses (UE 1 to UE 8) at the subframe #0 detected using the identifying signal (shaded portion in FIG. 12) (S309). FIG. 12 illustrates a case of transmitting the second NACKs in a batch.

At the subframes #1 and #3, the base station apparatus determines that all the terminal identification using the identifying signal is correct from the result of the terminal identification processing using the first CRC (YES in S304). In this case, the base station apparatus determines whether the base station apparatus correctly received the uplink data UE 9 to UE 14 (S306). In this case, on the basis of the detection result, the base station apparatus transmits an ACK or a first NACK (the area hatched diagonally left up in FIG. 12) to the UE 9 to the UE 14 at the downlink subframe #5 (the ACK/NACK #1-9 to the ACK/NACK #1-12, the ACK/NACK #3-13 to the ACK/NACK #3-14). Note that, FIG. 12 illustrates a case where the transmission timing of the ACK/NACK #3 is configured to ½ of the transmission timing of the ACK/NACK #1.

Next, an HARQ indicator using a plurality of types of NACKs according to this embodiment will be described. The higher layer processing unit 101 inputs an HARQ indicator (delivery acknowledgement, ACK/NACK) using a plurality of types of NACKs to the transmitter 103. Let us assume that the HARQ indicator is $a_{n0}, a_{n1}, \ldots, a_{n(L-1)}$. n is determined according to the unit at which the HARQ indicator is transmitted. In a case that the ACK/NACK is transmitted for each terminal apparatus, n corresponds to the ACK/NACK for the uplink data of the terminal apparatus 20-n. In a case that the ACK/NACKs are transmitted in a batch at each subframe, n corresponds to the ACK/NACK for the uplink data transmitted at a subframe n. In a case that the ACK/NACKs are transmitted in a batch for each identifying signal, n corresponds to the ACK/NACK for the uplink data transmitted by the terminal apparatus having the identifying signal n. L is the number of bits of the HARQ indicator.

In a case that the number of bits of ACK/NACKs in a batch for the subframe n is 2, the HARQ indicator "$a_{n0}, a_{n1}$" indicates that the first NACK is "00", the second NACK is "01", the ACK is "11". In the HARQ indicator "$a_{n0}, a_{n1}$", $a_{n0}$ may be a bit indicating the ACK/NACK, and $a_{n1}$ may also be a bit indicating the type (or reason) of NACK. $a_{n1}$="0" means that an uplink data error has been detected, and $a_{n1}$="1" means that the terminal apparatus has failed to be identified.

An example will be described of generating the physical retransmission request instruction channel such that data is multiplied by a spreading code sequence and a plurality of ACK/NACKs are transmitted. The coding unit 1031 may perform repetition on the HARQ indicator. For example, in a case that the repetition is performed on the 2-bit HARQ indicator "$a_{n0}, a_{n1}$" three times, the repeated HARQ indicator indicates that the first NACK is "000000", the second NACK is "010101", and the ACK is "111111". The modulating unit 1032 performs data modulation on the output data of the coding unit 1031. For example, the modulation unit 1032 performs the data modulation using QPSK. This makes it possible to suppress an increase in the number of bits by using a plurality of types of NACKs (for example, 2 bits ACK/NACK can be configured to the same number of bits as in the case where the ACK/NACK is represented by 1 bit). In a case that the ACK/NACK is indicated by 1 bit, the base station apparatus and the terminal apparatus may perform each processing by regarding the NACK "0" as the first NACK "00" and the ACK "1" as the ACK "11".

Further, the modulating unit 1032 multiplies the data after the data modulation by a prescribed sequence (spreading sequence) (the data after the data modulation is spread by the prescribed sequence). An orthogonal sequence (or a quasi-orthogonal sequence) can be used as the spreading sequence. In the case of ACK/NACK transmission in a batch, the spreading sequence can be associated with a parameter common to the terminal apparatuses. The spreading sequence is associated with an identifier generated by the parameter common to the terminal apparatuses. The parameter common to the terminal apparatuses can include the subframe number/the slot number/the symbol number/the system frame number/the frequency resource where the uplink data/identifying signal is transmitted and the identifying signal sequence common to the terminal apparatuses. For example, the parameter common to the terminal apparatuses is used as the generation parameter of the spreading sequence. On the other hand, in the case of ACK/NACK transmission for each terminal apparatus, the spreading sequence can be associated with a parameter related to the identifying signal unique to the terminal apparatus and an identifier unique to the terminal apparatus. The parameter related to the identifying signal includes an identifying signal sequence (orthogonal sequence/quasi-orthogonal sequence), a phase rotation amount, cyclic delay amount, interleave pattern, OCC, or the like applied to the identifying signal sequence. The identifier unique to the terminal apparatus includes the UE ID assigned to each terminal apparatus. For example, the ACK/NACK for each terminal apparatus is spread with an identifying signal sequence unique to the terminal apparatus/a sequence generated from a parameter related to the identifying signal unique to the terminal apparatus.

In another aspect, a case will be described in which the CRC is added, and the physical retransmission request instruction channel is generated. The higher layer processing unit 101 can add the CRC parity bits to information related to the uplink data retransmission including a plurality of HARQ indicators. The bit sequence after the CRC addition is "$x_0, x_1, \ldots x_{q-1}, p_0, p_1, \ldots p_{r-1}$" (q is the total number of bits of ACK/NACK, and r is the number of CRC parity bits), where x is the bit sequence of the HARQ indicator and p is the CRC parity bit sequence. The bit sequence of the HARQ indicator is constituted by an ACK/NACK field for each uplink data. The ACK/NACK field for each uplink data can include a bit sequence of information on the uplink data retransmission.

In the ACK/NACK #0 transmitted at the subframe #4 in FIG. 12, "$x_0, x_1, \ldots x_{q-1}$" is a bit sequence of the ACK/NACKs in a batch for the uplink data UE 1 to UE 8. In the case of the ACK/NACKs in a batch, the higher layer processing unit 101 scrambles the CRC parity bits "$p_0, p_1, \ldots p_{r-1}$" using a sequence associated with the identifier common to the terminal apparatuses. For example, in FIG. 12, in a case that the CRC parity bit length is 16 bits, and the sequence associated with the identifier common to the terminal apparatuses is 1 plus the number of a subframe at which the ACK/NACK is transmitted, the CRC parity bits of the ACK/NACK to be transmitted at the subframe #4 is scrambled with the sequence of "0000000000000101".

In the ACK/NACK transmitted at the subframe #5 in FIG. 12, "$x_0, x_1, \ldots, x_{q-1}$" of each ACK/NACK #m-n is a bit sequence of the ACK/NACK for each terminal apparatus for the uplink data UE 9 to UE 14. In this case, the higher layer processing unit 101 scrambles the CRC parity bits "$p_0, p_1, \ldots p_{r-1}$" with a sequence associated with the identifier unique to the terminal apparatus.

In the physical retransmission request instruction channel generated by adding the CRC, the first NACK and the second NACK are distinguished by an identifier for scrambling (EXCLUSIVE-OR operation or masking) the CRC parity bits. For example, the first NACK is scrambled using a parameter related to the identifying signal unique to the terminal apparatus or the identifier unique to the terminal apparatus. The second NACK is scrambled using the sequence associated with the identifier common to the terminal apparatuses.

The physical retransmission request instruction channel may be configured for the first NACK and the second NACK such that the physical retransmission request instruction channel that allows a plurality of ACK/NACKs to be transmitted by multiplying the spreading code sequence is used, or the physical retransmission request instruction channel that allows a plurality of ACK/NACKs generated by adding CRC to be transmitted is used.

Next, the uplink data retransmitted for various NACKs will be described. The terminal apparatus receives the ACK/NACK for the uplink data (initial transmission) (S105 in FIG. 2). Upon receiving the first NACK, the terminal apparatus retransmits the data related to the uplink data (initial transmission) (S106 in FIG. 2). The data related to the uplink data may be the same as the uplink data (the data bits and parity bits transmitted in the initial transmission) transmitted in the initial transmission, or data not transmitted in the initial transmission (the data bits and parity bits not transmitted in the initial transmission). Also, the data related to the uplink data may be data including both the uplink data transmitted in the initial transmission and the data not transmitted in the initial transmission. In this case, the base station apparatus that received the retransmission data performs signal detection processing using the uplink data (initial transmission) and the uplink data (retransmission). In the detection processing, the base station apparatus can use Chase synthesis and Incremental Redundancy (IR).

Upon receiving the second NACK, the terminal apparatus retransmits the same data (the data bits and parity bits transmitted in the initial transmission) as the uplink data (S106 in FIG. 2). The uplink data (retransmission) may be data including both the data bits and parity bits transmitted in initial transmission and the data bits and parity bits not transmitted in initial transmission. In this case, the base station apparatus that received the retransmission data performs the signal detection processing using the uplink data (initial transmission).

Next, retransmission timing of the uplink data for various NACKs will be described. The base station apparatus transmits the information indicating the retransmission timing of the uplink data to the terminal apparatus as the system information/the RRC message/the Downlink Control Information (S103 in FIG. 2). The base station apparatus can also transmit the information indicating the retransmission timing to the terminal apparatus using the physical retransmission request instruction channel (S105 in FIG. 2). For example, the information indicating the retransmission timing of the uplink data is configured by the reference time and the offset value with respect to the reference time.

In S105 of FIG. 3, the terminal apparatus that received the first NACK retransmits the uplink data according to the reference time (namely, offset value=0) (S106). On the other hand, the terminal apparatus that received the second NACK retransmits the uplink data at the retransmission interval obtained by the reference time plus the selected offset value (S106). The offset value may be randomly selected by the terminal apparatus or may be instructed by the base station apparatus.

As described above, the communication system according to the present embodiment defines multiple types of NACKs depending on the reason of transmitting the NACKs. The type of NACK is associated with the identification of the terminal apparatus. This allows, the base station apparatus and the terminal apparatus to efficiently control retransmission in consideration of the multiplexing state of the uplink data in the grant-free multiple access in which the base station apparatus cannot pre-schedule resources with which the uplink data is transmitted.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily stored in a volatile memory, such as a Random Access Memory (RAM), a non-volatile memory, such as a flash memory, a Hard Disk Drive (HDD), or other storage device systems.

Note that a program for realizing the functions of the embodiments according to the present invention may be recorded in a computer readable recording medium. The program recorded in this recording medium may be read and executed by a computer system to realize the functions. It is assumed that the "computer system" refers to a computer system built into the apparatuses, and the computer system includes an operating system and hardware components such as a peripheral device. Further, the "computer-readable recording medium" may be a semiconductor recording medium, an optical recording medium, a magnetic recording medium, a medium that holds a program dynamically for a short period of time, or another recording medium that can be read by a computer.

Furthermore, each functional block or various characteristics of the apparatuses used in the above-described embodiment may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA) or other programmable logic devices, discrete gates or transistor logic, discrete hardware components, or a combination thereof. The general-purpose processor may be a microprocessor, a processor of known type, a controller, a microcontroller, or a state machine. The above-mentioned electric circuits may be constituted by a digital circuit, or may be constituted by an analog circuit. Furthermore, in a case that with advances in semiconductor technology, a circuit integration technology appears that replaces the present integrated circuits, it is possible for one or more of the aspect of present invention to also use a new integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The present international application claims priority based on JP 2016-133243 filed on Jul. 5, 2016, and all the contents of JP 2016-133243 are incorporated in the present international application by reference.

REFERENCE SIGNS LIST

10 Base station apparatus
20-1 to 20-n Terminal apparatus
10a Range in which base station apparatus 10 can connect with terminal apparatus
101 Higher layer processing unit
102 Controller
103 Transmitter
104 Receiver
105 Transmit antenna
106 Receive antenna
1031 Coding unit
1032 Modulating unit
1033 Downlink reference signal generation unit
1034 Multiplexing unit
1035 Radio transmitting unit
1041 Radio reception unit
1042 Demultiplexing unit
1043 Signal detection unit
1044 Channel estimation unit
1045 Identification unit
1501 Cancellation unit
1502 Equalization unit
1503-1 to 1503-u IDFT unit
1504-1 to 1503-u Demodulation unit
1505-1 to 1503-u Decoding unit
1506 Replica generation unit
201 Higher layer processing unit
202 Controller
203 Transmitter
204 Receiver
205 Transmit antenna
206 Receive antenna
2031 Coding unit
2032 Modulating unit
2033 Uplink reference signal generation unit
2034 Multiplexing unit
2035 Radio transmitting unit
2036 Identifying signal generation unit
2041 Radio reception unit
2042 Demultiplexing unit
2043 Demodulation unit
2044 Decoding unit

The invention claimed is:

1. A terminal apparatus configured to communicate with a base station apparatus,
the terminal apparatus comprising:
a transmitter configured to transmit an identifying signal indicating that the terminal apparatus itself transmits an uplink data channel and the uplink data channel; and
a receiver configured to receive a signal indicating delivery acknowledgement for the uplink data channel,
wherein the uplink data channel includes an uplink data bit, a bit representing an identifier of the terminal apparatus itself, a first error detection bit generated from the uplink data bit, and a second error detection bit generated from the identifier of the terminal apparatus itself, and
the first error detection bit is scrambled using the identifier of the terminal apparatus, and the second error detection bit is scrambled using the identifying signal.

2. The terminal apparatus according to claim 1,
wherein the receiver is configured to descramble the signal indicating the delivery acknowledgement using a sequence associated with the identifier of the terminal apparatus.

3. The terminal apparatus according to claim 1,
wherein the receiver is configured to descramble the signal indicating the delivery acknowledgement using a sequence associated with the identifying signal.

4. The terminal apparatus according to claim 1,
wherein the receiver is configured to descramble the signal indicating the delivery acknowledgement using a sequence associated with a subframe number of a subframe at which the uplink data channel is transmitted.

5. The terminal apparatus according to claim 1,
wherein the receiver is configured to descramble the signal indicating the delivery acknowledgement using a sequence associated with a subframe number of a subframe at which the identifying signal is transmitted.

6. The terminal apparatus according to claim 1,
wherein the base station apparatus is configured to interpret that the base station apparatus fails to identify a terminal in a case that the receiver could not receive the signal indicating the delivery acknowledgement for the uplink data channel using an identifier applied on the first error detection bit.

7. The terminal apparatus according to claim 1,
wherein the terminal apparatus is configured to assume that the terminal apparatus itself is not identified by the base station apparatus in a case that the receiver does not receive the signal indicating the delivery acknowledgement for the uplink data channel by a receive timing of a signal indicating transmission acknowledgement.

8. A base station apparatus configured to communicate with a terminal apparatus,
the base station apparatus comprising:
a receiver configured to receive an identifying signal for identifying a terminal apparatus that transmits an uplink data channel and the uplink data channel; and
a higher layer processing unit configured to perform error detection using a first error detection bit and a second error detection bit included in the uplink data channel,
wherein the receiver is configured to perform descrambling processing for the first error detection bit using the identifying signal and to perform descrambling processing for the second error detection bit using an identifier of the terminal apparatus used for generating the first error detection bit.

9. The base station apparatus according to claim 8, further comprising:
a transmitter configured to transmit a signal indicating delivery acknowledgement for the uplink data channel,
wherein the transmitter is configured to scramble the signal indicating the delivery acknowledgement using a sequence associated with the identifier of the terminal apparatus.

10. The base station apparatus according to claim 9,
wherein in a case that an error is detected with a first error detection bit, the transmitter is configured to scramble the signal indicating the delivery acknowledgement using the sequence associated with the identifier of the terminal apparatus.

11. The base station apparatus according to claim 8, further comprising:
a transmitter configured to transmit a signal indicating delivery acknowledgement for the uplink data channel,
wherein the transmitter is configured to scramble the signal indicating the delivery acknowledgement using a sequence associated with the identifying signal.

12. The base station apparatus according to claim 11,
wherein in a case that an error is detected with a second error detection bit, the transmitter is configured to scramble the signal indicating the delivery acknowledgement using the sequence associated with the identifying signal.

13. A method of communication used in a terminal apparatus for communicating with a base station apparatus, the method comprising the steps of:
transmitting an identifying signal indicating that the terminal apparatus itself transmits an uplink data channel and the uplink data channel; and
receiving a signal indicating delivery acknowledgement for the uplink data channel
wherein the uplink data channel includes an uplink data bit, a bit representing an identifier of the terminal apparatus, a first error detection bit generated from the uplink data bit, and a second error detection bit generated from the identifier of the terminal apparatus, and
the first error detection bit is scrambled using the identifier of the terminal apparatus, and the second error detection bit is scrambled using the identifying signal.

14. A method of communication used in a base station apparatus for communicating with a terminal apparatus, the method comprising the steps of:
receiving an identifying signal for identifying a terminal apparatus that transmits an uplink data channel and the uplink data channel; and
performing error detection using a first error detection bit and a second error detection bit included in the uplink data channel,
wherein in the step of performing error detection, descrambling processing is performed for the first error detection bit using the identifying signal, and descrambling processing is performed for the second error detection bit using an identifier of the terminal apparatus used for generating the first error detection bit.

* * * * *